(12) United States Patent
Wei

(10) Patent No.: US 12,048,304 B2
(45) Date of Patent: Jul. 30, 2024

(54) APPARATUS FOR BIOLOGICAL MATERIAL STORAGE AND TRANSPORT

(71) Applicant: X-Therma, Inc., Richmond, CA (US)

(72) Inventor: Xiaoxi Wei, El Cerrito, CA (US)

(73) Assignee: X-Therma, Inc., Hercules, CA (US)

( * ) Notice: Subject to any disclaimer, the term of this patent is extended or adjusted under 35 U.S.C. 154(b) by 280 days.

(21) Appl. No.: 17/219,461

(22) Filed: Mar. 31, 2021

(65) Prior Publication Data

US 2021/0298290 A1    Sep. 30, 2021

Related U.S. Application Data

(60) Provisional application No. 63/003,073, filed on Mar. 31, 2020.

(51) Int. Cl.
*A01N 1/02* (2006.01)

(52) U.S. Cl.
CPC ......... *A01N 1/0252* (2013.01); *A01N 1/0221* (2013.01)

(58) Field of Classification Search
CPC ............................ A01N 1/0252; A01N 1/0221
See application file for complete search history.

(56) References Cited

U.S. PATENT DOCUMENTS

| | | |
|---|---|---|
| 5,355,684 A | 10/1994 | Guice |
| 8,919,598 B2 | 12/2014 | Kampf et al. |
| 2007/0028642 A1 | 2/2007 | Glade et al. |
| 2011/0290792 A1 | 12/2011 | Krzak et al. |
| 2014/0157713 A1* | 6/2014 | Kampf .................. F16L 59/065 52/590.1 |
| 2015/0151893 A1 | 6/2015 | Wengreen et al. |
| 2016/0250101 A1 | 9/2016 | Wengreen et al. |
| 2016/0251140 A1* | 9/2016 | Wengreen ............... B65B 63/08 62/457.2 |
| 2016/0347532 A1 | 12/2016 | McCormick |

FOREIGN PATENT DOCUMENTS

WO    2018/232110 A1    12/2018

OTHER PUBLICATIONS

Application No. PCT/US2021/025154, International Preliminary Report on Patentability, Mailed on Oct. 13, 2022, 12 pages.
Application No. PCT/US2021/025154, International Search Report and Written Opinion, Mailed on Jun. 30, 2021, 13 pages.
European Patent Application No. 21779805.7, Extended European Search Report, Apr. 8, 2024, 10 pages.

* cited by examiner

*Primary Examiner* — Marcia S Noble
*Assistant Examiner* — Lauren K Van Buren
(74) *Attorney, Agent, or Firm* — Kilpatrick Townsend & Stockton LLP

(57) ABSTRACT

The present technology relates to apparatuses and methods for preserving biological material, for example cryopreserved biological material, such as cells, tissues, and organs for storage and/or transport. Apparatuses and methods of the present technology preserve biological material at a target temperature within a range of 8° C. to −40° C. for extended periods of time, for example at least 4 hours. The target temperature and extended period of time may be achieved with the use of cold sources such as phase change materials (PCMs) in combination with insulation materials, such as vacuum insulation panels (VIPs) and/or aerogels.

11 Claims, 20 Drawing Sheets

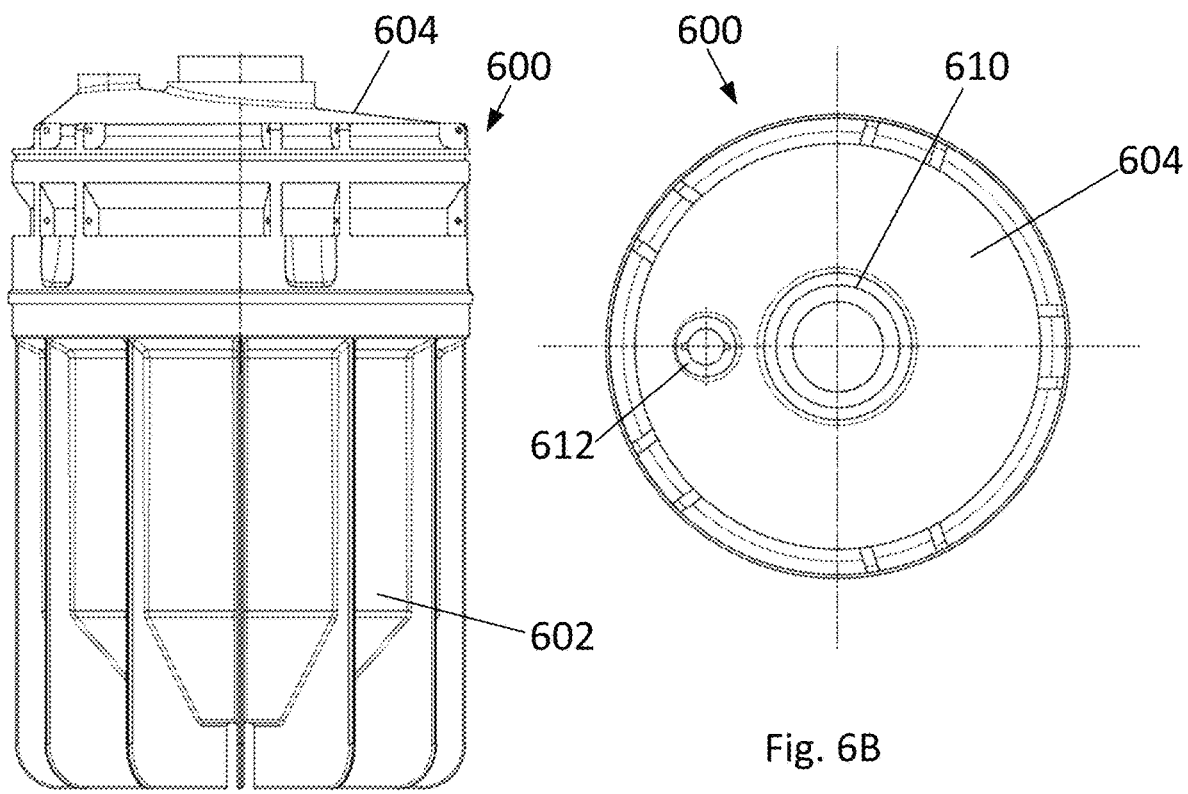
Fig. 6B
Fig. 6A
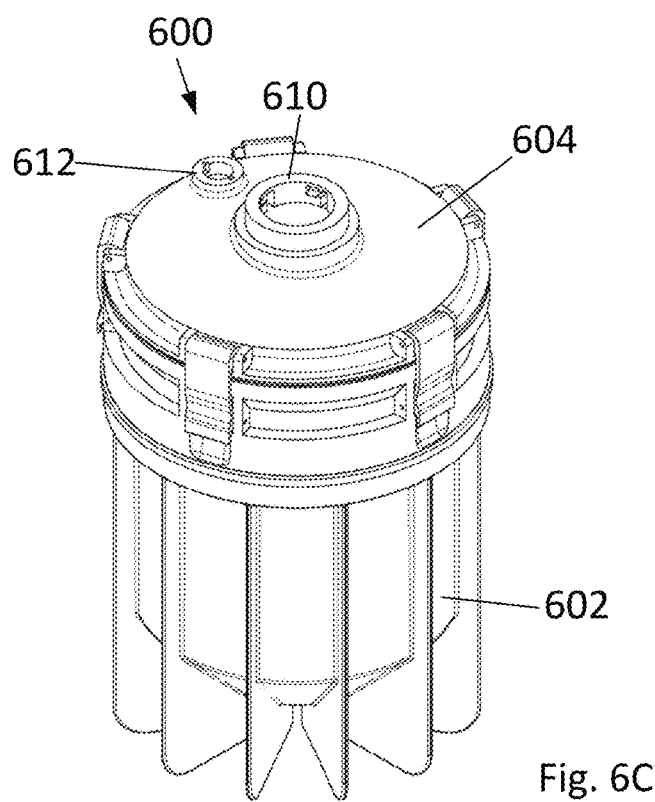
Fig. 6C

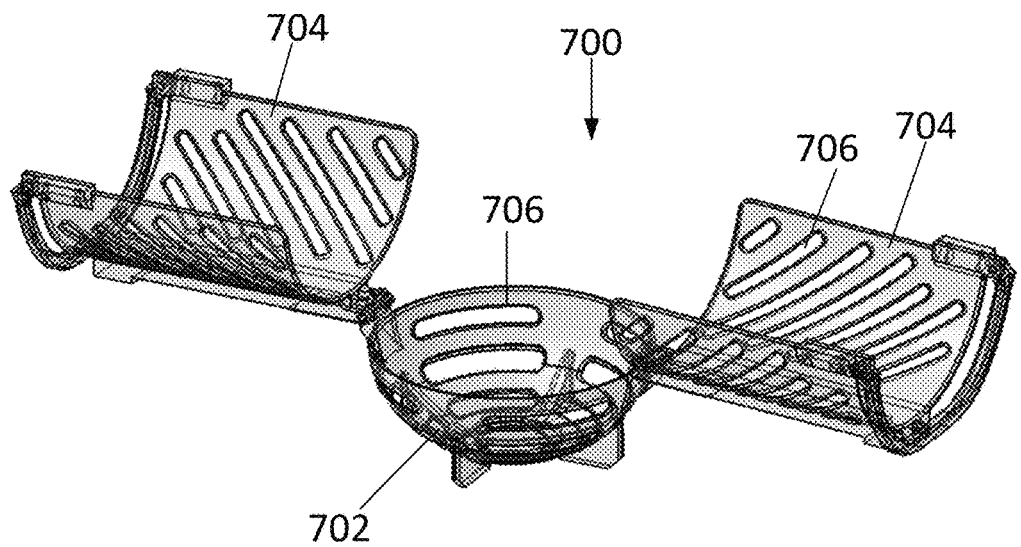
Fig. 7A
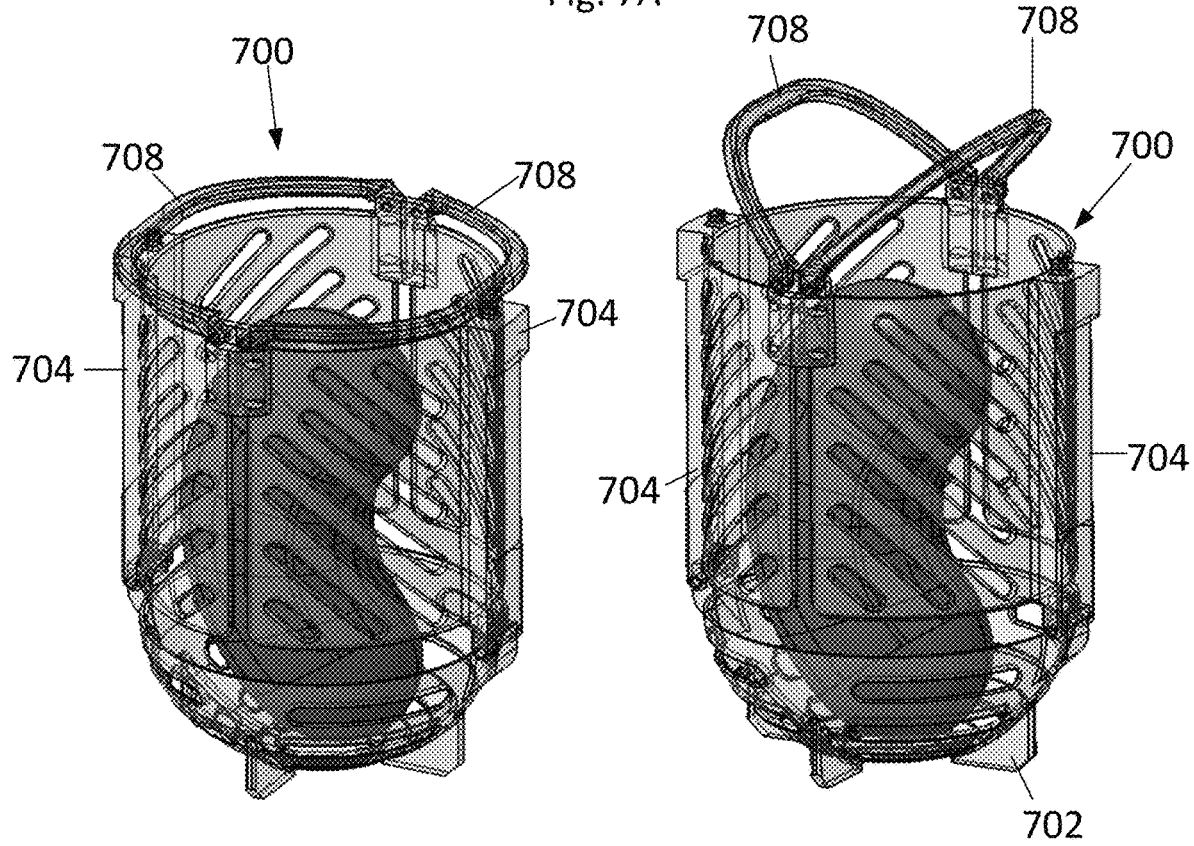
Fig. 7B
Fig. 7C

APPARATUS FOR BIOLOGICAL MATERIAL STORAGE AND TRANSPORT

CROSS-REFERENCE TO RELATED APPLICATIONS

This application claims the benefit of U.S. Provisional Application No. 63/003,073 filed on Mar. 31, 2020, the disclosure of which is hereby incorporated by reference in its entirety for all purposes.

FIELD OF THE INVENTION

The technology relates to apparatuses and methods for storage and transport of biological material, for example DNA, RNA, proteins, lipids, biologics, components of cells, natural and engineered cells, natural or engineered tissues, and organs.

BACKGROUND OF THE INVENTION

Transportation of biological material may be challenging when the biological material must be maintained within a narrow temperature range in a passive manner due to inaccessibility or unreliability of a refrigeration power source during transport. Currently, biomaterials are preserved in cryogenic conditions using liquid nitrogen (−140° C. to −196° C.) or dry ice (−78° C.), and transported in dewars. However, cryoprotectants have been developed that enable storage at high sub-zero temperatures, e.g. 0° C.-20° C., with the same protective results of the same biomaterial at the much lower temperatures associated with liquid nitrogen and dry ice. To ensure the safe storage and/or transport of biological material, and to maximize the viability after storage and/or transport, it is necessary to preserve the samples in a suitable apparatus or container at temperatures above the temperatures liquid nitrogen and dry ice are able to maintain. Accordingly there is a need for an apparatus and method for transporting biological material at high sub-zero temperature, 0° C. to −40° C., without the use of dry ice or liquid nitrogen.

BRIEF SUMMARY OF THE INVENTION

The present technology relates to apparatuses and methods for preserving biological material of any origin, and particularly cryopreserved biological material including DNA, RNA, proteins, lipids, biologics, components of cells, natural and engineered cells, natural or engineered tissues, and organs for storage and/or transport. Apparatuses and methods of the present technology preserve biological material at a target temperature within a range of 8° C. to −40° C. (e.g., 2° C. to 8° C. or 0° C. to −40° C.) for extended periods of time, for example at least 4 hours. The target temperature and extended period of time may be achieved with the use of cold sources, such as a phase change materials (PCMs), in combination with insulation materials, such as vacuum insulation panels (VIPs) and/or aerogels.

BRIEF DESCRIPTION OF THE DRAWINGS

The disclosure will be readily understood by the following detailed description in conjunction with the accompanying drawings, wherein like reference numerals designate like structural elements, and in which:

FIGS. 6A-6G show views of biological material containers for organs in accordance with embodiments of the disclosed technology.

FIGS. 7A-7C show views of embodiments of an organ tray in accordance with embodiments of the disclosed technology.

DETAILED DESCRIPTION OF THE INVENTION

Figure 1A:
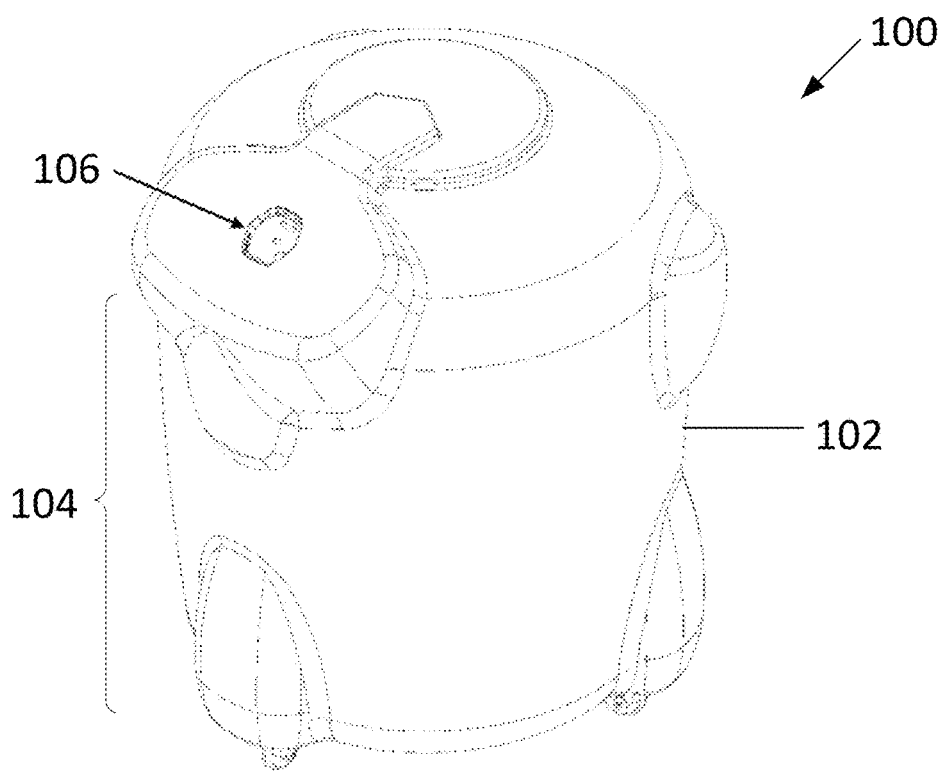
FIG. 1A shows a biological material transport apparatus in accordance with embodiments of the disclosed technology.

The present technology includes apparatuses and methods for transporting biological material. In embodiments, for example as shown in FIG. 1, a biological transport apparatus 100 comprises an outer housing 102, an insulation assembly 200, a cold source assembly 300, and one or more containers 400 500 600 for containing the biological material. The biological transport apparatus may be used to transport biological materials such as cells, tissues, and organs. The biological material may be cryopreserved during transport and passively kept at a target temperature for extended periods of time. The target temperature may be in the range 8° C. to −40° C., and more specifically may be in the subzero range of between 0° C. and −15° C. (i.e. 0° C.>target temperature>−15° C.). The extended periods of time may be at least 4 hours, and up to 10 days or more, or any duration in between. Maintaining the target temperature over the extended period of time is achieved with the use of cold sources such as phase change materials (PCMs) in combination with insulation materials, such as vacuum insulation panels (VIPs) or aerogels. The temperature of the biological material may be maintained within a predefined tolerance of the target temperature for the entire extended period of time without changing the cold source and without the use of powered refrigeration. The predefined tolerance may be based on the type of cryoprotectant used and/or the type of biological material being transported or stored. The predefined tolerance may between ±0.5° C. and +5° C.

Outer Housing

Figure 1B:
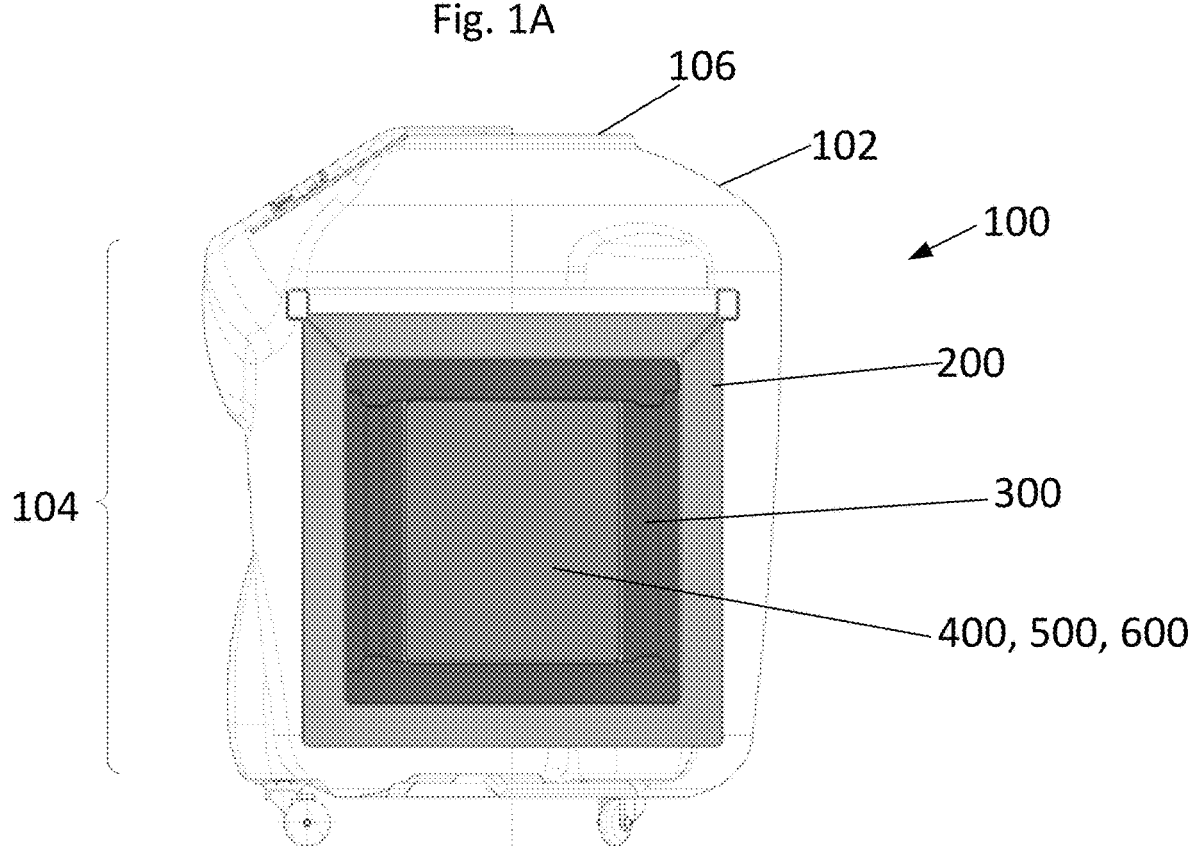
FIG. 1B shows a cross-section of biological material transport apparatus in accordance with embodiments of the disclosed technology.

Apparatuses for transporting biological material, may include an outer housing, which also may be referred to as an outer shell. The outer housing may serve as a protective covering to the inner components of the apparatus. FIGS. 1A and 1B show an embodiment of an apparatus 100 comprising an outer housing 102. The apparatus 100 is shown with the outer housing 102 in a closed configuration. The outer housing may comprise a lower housing portion 104 and a lid 106. The lower housing portion 104 of the body 102 defines a cavity, with may be referred to as a first cavity. As shown in the cross-section of FIG. 1B, the cavity of the lower housing portion 104 houses the insulation assembly 200, cold source assembly 300, and one of more containers 400, 500, 600, 700 holding the biological material, as discussed in more detail below. In embodiments, the insulation layers may be integrally formed within the lower housing portion 104 and the lid 106.

The outer housing can be any shape. In embodiments, for example as shown in FIGS. 1A and 1B, the outer housing is generally cylindrical. As shown, the lower housing portion defines a generally cylindrical first cavity for housing the other components of the device, including but not limited to: insulation layers, cold sources, and biological material containers. In embodiments, the lid may form a water and/or air tight seal with the lower housing portion. The lid may be coupled with a hinge so that the lid is pivotable between an open/loading configuration, and a closed/sealed configuration. In embodiments, the lid and/or lower housing portion may include latches for maintaining a seal, and preventing unintentional opening of the outer housing.

In order to protect the physical integrity of the apparatus and to ensure safe transport at the target temperature of the biological material, the outer housing is made of a material that is rigid and is resistant to becoming brittle at low temperatures, for example the target temperature of the biological material. Additionally, the outer housing comprises a material that has a low thermal conductivity or high thermal resistivity. Non-limiting examples of suitable materials that can be used in construction of the outer housing include expanded polystyrene (EPS) and expandable polypropylene (EPP).

In embodiments, the outer housing may comprise elements that facilitate movement or carrying, for example: wheels, straps and handles. For example, the lower housing portion may include wheels on casters on the lower side and the lid may include handles around a perimeter, in order to allow the apparatus to be pushed in any direction along a surface. The outer housing may be considered to be a "hard case" in order to be resistant to deformation to an exterior pressure in the range of about 90 to about 110 kPa at a temperature of about −40° C. to about 50° C.

Insulation Assembly

Figure 2:
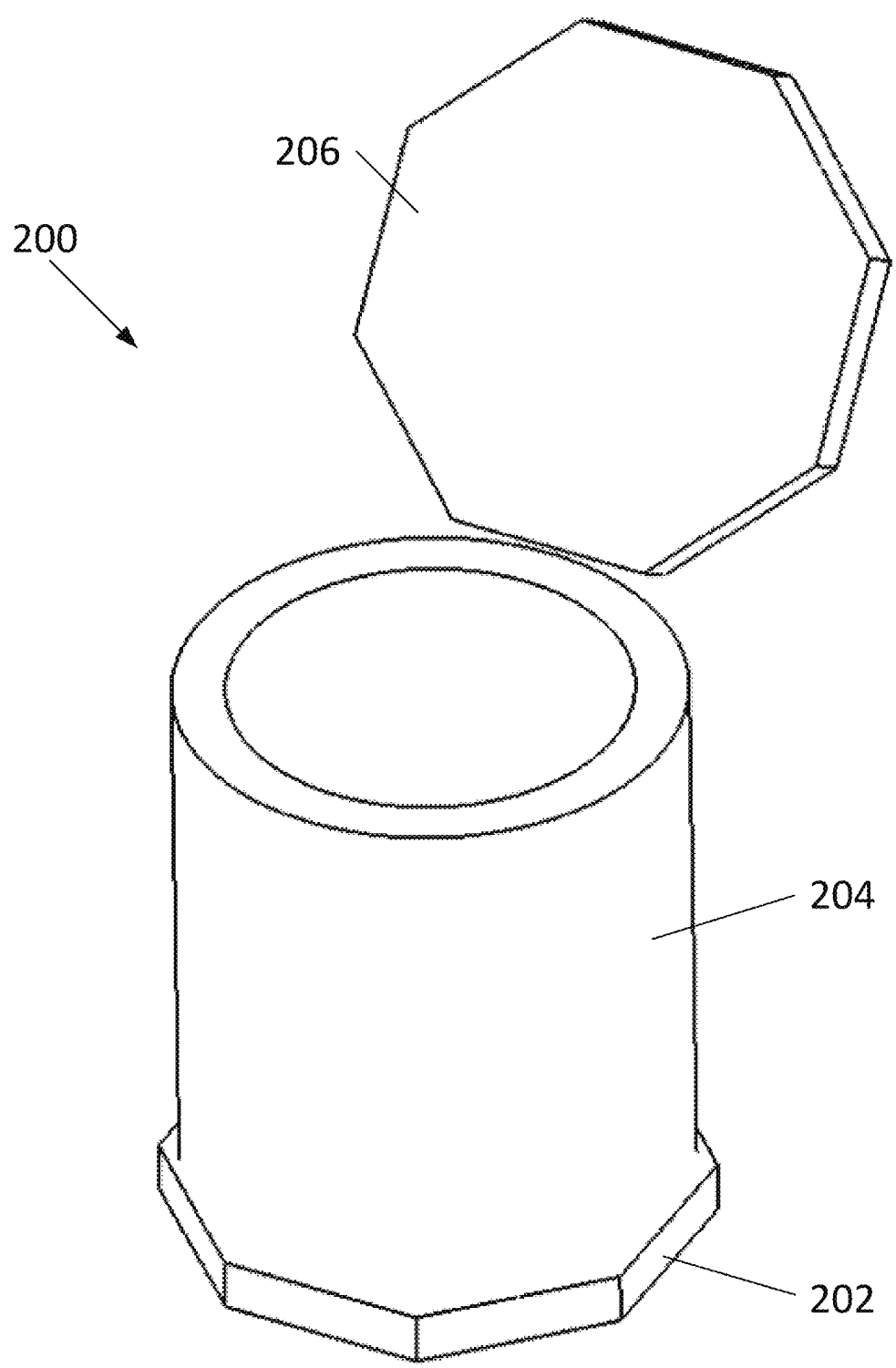
FIG. 2 shows an insulation assembly in accordance with embodiments of the disclosed technology.

As shown in FIG. 1B, an insulation assembly 200 may be positioned within the first cavity of the outer housing. The insulation assembly 200 comprises one or more materials that have low thermal conductivity. The insulation assembly forms a second cavity. In embodiments, the second cavity may be cylindrical. In embodiments, for example as shown in FIG. 2, an insulation assembly 200 comprises a base insulation panel 202, a cylindrical insulation sidewall panel 204, and an insulation lid 206, defining an enclosed cylindrical second cavity. Each of the base insulation panel 202, the cylindrical insulation sidewall panel 204, and the insulation lid 206 may comprise an outer layer that is impermeable to gas or liquid defining an internal volume of the insulation panel. The internal volume of the panel components of the insulation assembly may be a vacuum. Further, the internal volumes may contain getter material that absorbs trace gases in the internal volume in order to maintain the vacuum. Non-limiting examples of getter materials include substances (e.g. metals, oxides, etc) including one or more of titanium, sodium, potassium, magnesium, calcium, strontium, barium, cesium-rubidium alloys, tantalum, zirconium and rare-earth elements (e.g., hafnium).

In embodiments, the components of the insulation assembly may each be vacuum insulation panels (VIP). For example the cylindrical insulation sidewall panel may be a cylindrical VIP panel. The VIPs may comprise a glass fiber core and an adsorbent material that are sealed within an outer layer of laminate film. Together, the adsorbent and the outer film maintain the integrity of the vacuum. At least a portion of a VIP's insulating properties are due to the inner vacuum. In a vacuum, heat transfer by conduction and convection are inhibited. In embodiments, the insulating layer comprises two or more layers of VIP panels.

In embodiments, each of the components of the insulation assembly may comprise a vacuum port in fluid communication with the internal spaces of each component. The vacuum ports are connectable to a vacuum pump for evacuating air from the internal volume of each panel in order to define the vacuum.

In embodiments, the components of the insulation assembly comprise aerogel in the internal volumes. Aerogels are synthetic porous materials with low thermal conductivity and extremely low density that are derived from a gel in which the liquid component of the gel is replaced with a gas. Aerogels may be produced by employing supercritical drying to extract the liquid component of a gel, allowing the liquid to slowly dry off without causing the solid matrix in the gel to collapse. Aerogels are advantageous in that they achieve low rates of heat transmission and do not lose strength when subjected to a vacuum. In embodiments, the aerogel is selected from the group including, but not limited to, a silica aerogel, an alumina aerogel, a zirconia aerogel, a carbon aerogel, a boron aerogel, a tungsten aerogel, a titania aerogel, an aerogel made by the sol-gel polymerization of resorcinol with formaldehyde, and an aerogel made by the sol-gel polymerization of melamine with formaldehyde. In embodiments, the aerogel is disposed within a layer of metalized polyethylene.

Cold Source Assembly

Figure 1C:
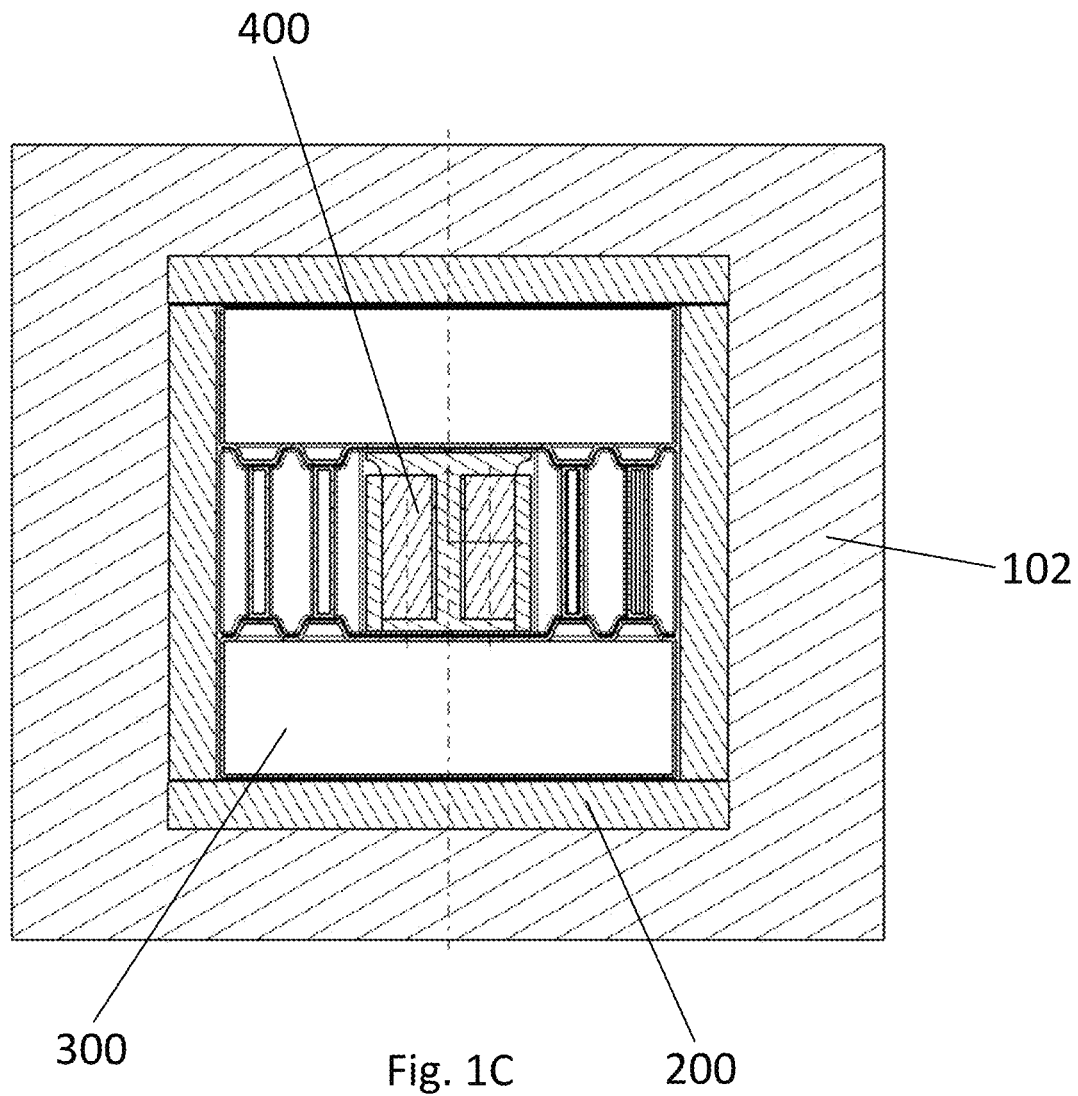
FIG. 1C shows a cross-section of internal components of a biological material transport apparatus in accordance with embodiments of the disclosed technology.
Figure 1D:
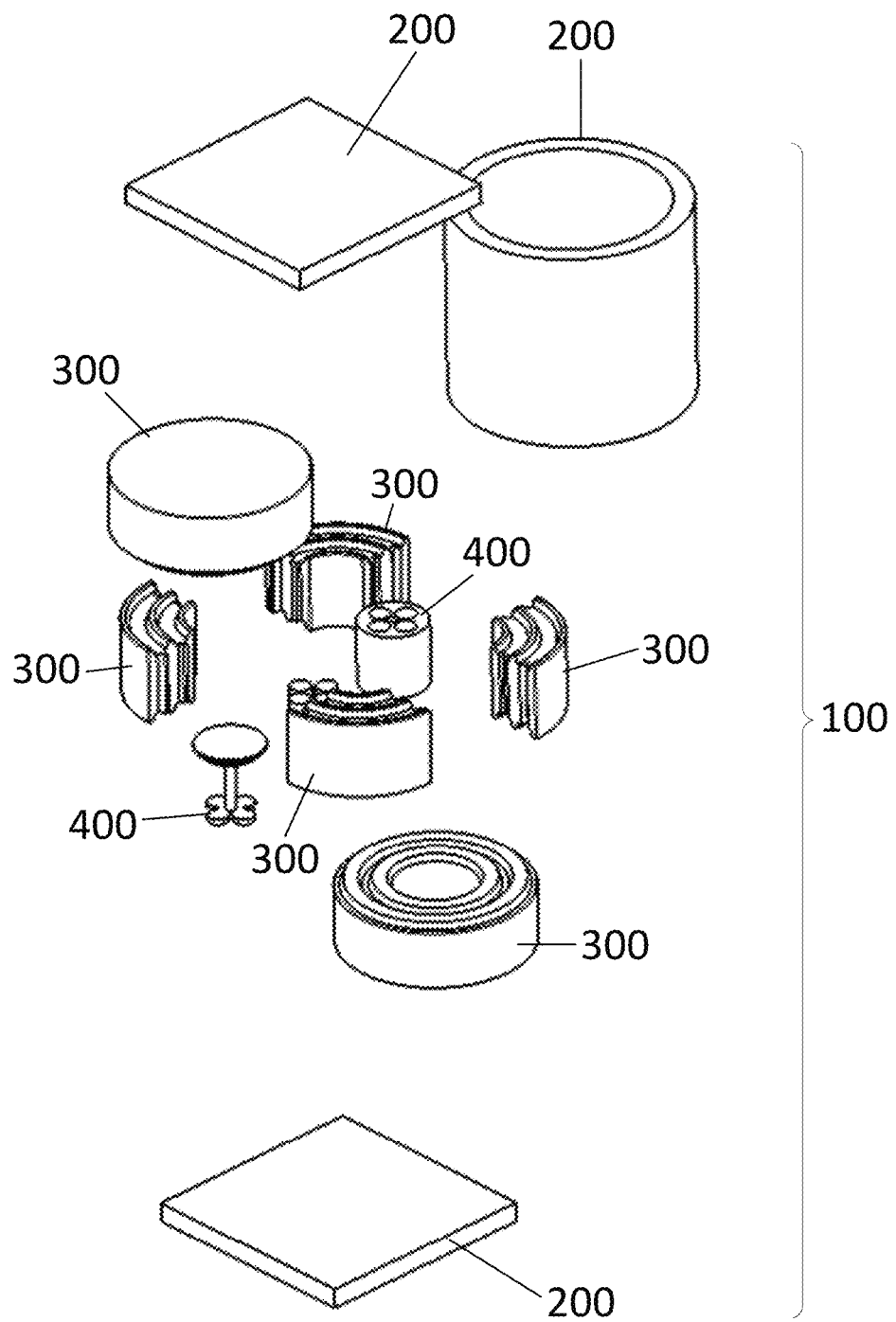
FIG. 1D shows an exploded view of biological material transport apparatus in accordance with embodiments of the disclosed technology.

As shown in the cross-section of FIG. 1C, the cold source assembly 300 is positioned between the insulation assembly 200 and the one or more containers 400 holding the biological material. The cold source assembly absorbs heat energy from the ambient and the biological material in order to maintain the biological material at the target temperature. In embodiments, a cold source assembly 300 comprises a plurality of panels. The panels are assembled to define a hollow cavity for receiving one or more containers containing the biological material. In embodiments, the assembled shape of the cold source assembly panels may be for example a cylinder, a polygonal prism (e.g. a cube, a rectangular prism, a pentagonal prism, a hexagonal prism, an octagonal prism), or a sphere. In embodiments, panels of cold source assemblies may each define a sub-portion of the internal cavity of the cold source assembly. For example a cylindrical cold source assembly may be comprised of two panels each being a lateral half of a cylinder and each defining a half-cylinder sub-portion (i.e. a curved side wall, a semi-circular top, and a semi-circular bottom) of a cylindrical internal cavity. Further, for example, a cylindrical cold source assembly may be comprised of two or more panels each being a longitudinal portion of a cylindrical assembly and each defining a cylindrical sub-portion of a longer cylindrical internal cavity defined by the longitudinally stacked cylindrical panels. The longitudinal portions may be any relative longitudinal length relative to each other, for example, two cylindrical panels may each be half the longitudinal length of the cold source assembly. In embodiments including polygonal prism shaped cold source assemblies, the panels of the cold source assembly may include a base panel and a top panel in the shape of the polygon, and a number of rectangular side panels corresponding to the number of sides of the polygon.

Figure 3A:
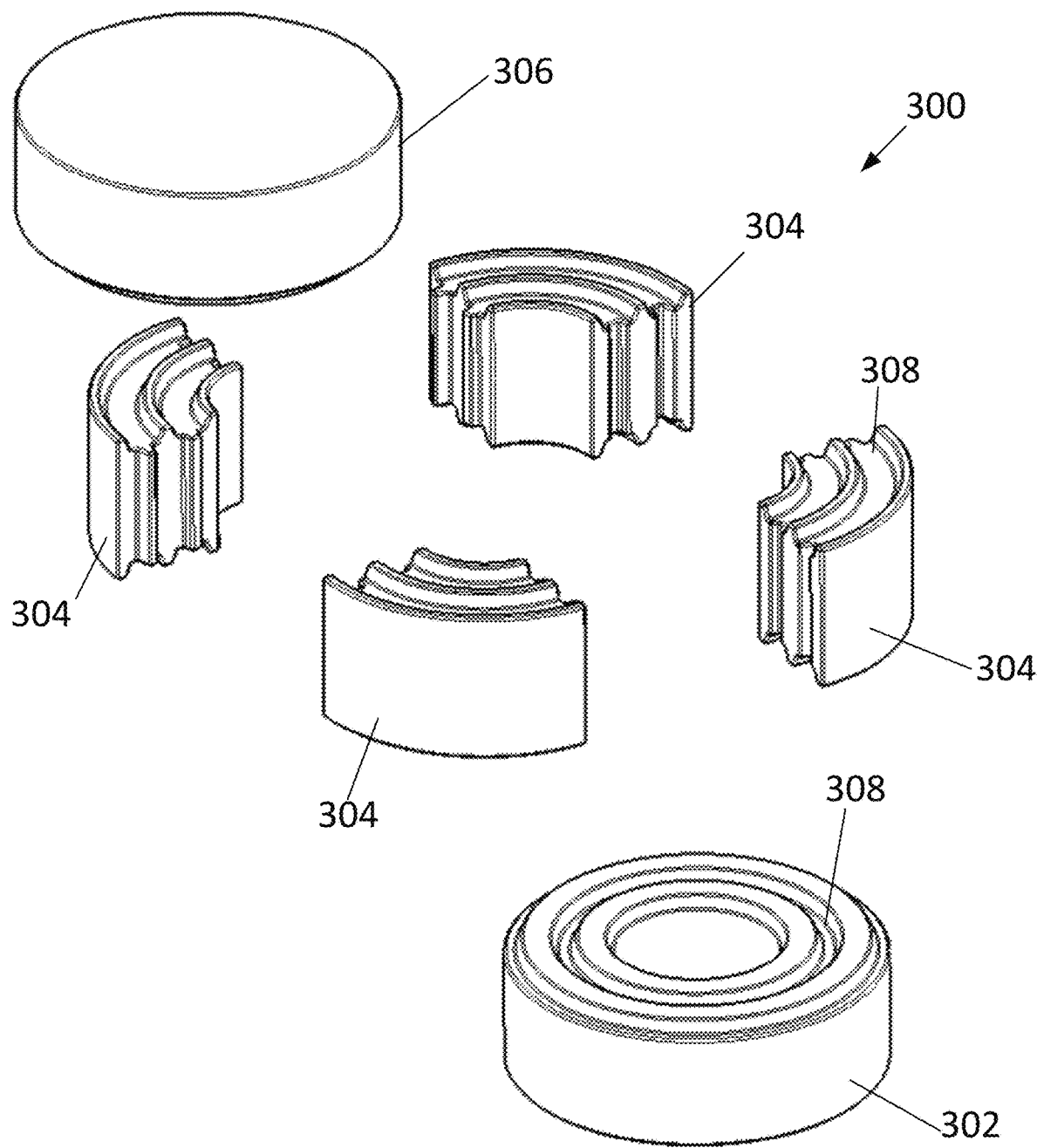
FIGS. 3A-3D show views of cold source assemblies and portions thereof in accordance with embodiments of the disclosed technology.
Figure 3B:
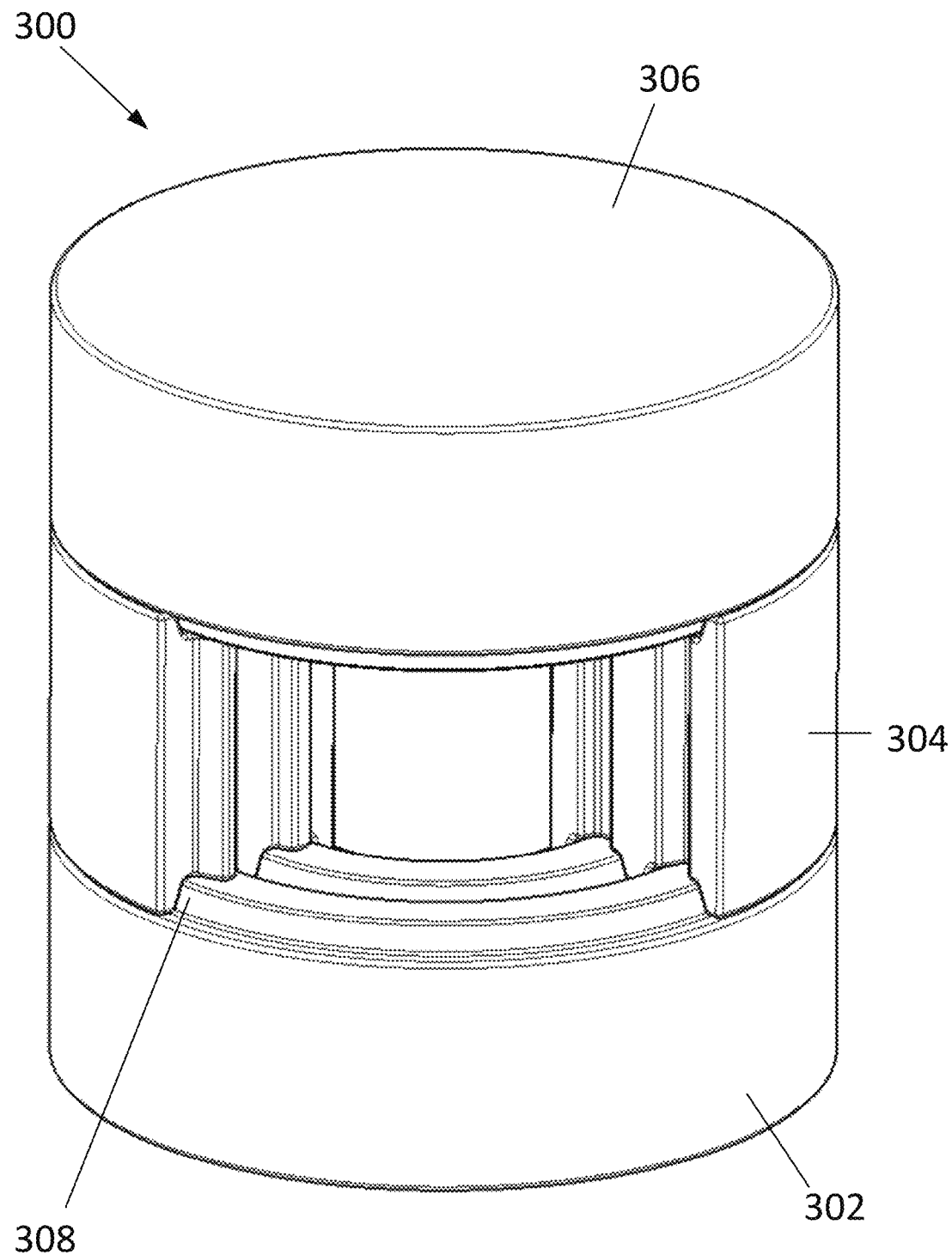

In the embodiments, for example as shown in FIGS. 3A and 3B, the plurality of panels of a cold source assembly 300 include a base panel 302, a plurality of curved sidewall panels 304, and a top lid panel 306. In embodiments, for example as shown in FIGS. 3A and 3B, the panels of a cold source assembly may be assembled to define a generally hollow cylindrical cold source container, wherein a sub-set of the panels, and as shown, the curved sidewall panels 304, define radial sides of the hollow cylinder. As shown in the cross-section of FIG. 1C, the hollow center of the cold source assembly houses the container(s), for example containers 400, 500, 600 and 700, holding the biological material.

In embodiments, the panels of a cold source assembly may include features for maintaining adjacent panels in the assembled configuration, for example interlocking tabs and corresponding recesses along adjacent edges/faces of adjacent panels. For example, as shown in FIGS. 3A and 3B. the panels of the cold source assembly include perimeters with tongue and groove features 308 which form tongue and groove joints with adjacent panels of the cold source assembly when in the assembled configuration. Interlocking tabs and corresponding recesses, for example tongue and groove joints, have multiple advantages, including self-alignment of the panels, improved structural integrity, and a reduction of spaces between panels that would undesirably allow air to flow into the hollow center cavity of the cold source assembly which is to contain the container of biological material. In embodiments, the interlocking tabs and corresponding recesses define portions of the interior volume of the panels containing PCMs, which will be discussed in greater detail below.

To assemble the cold source assembly, the panels may be assembled outside of the second cavity of the insulation assembly and/or inside of the second cavity of the insulation assembly. For example, relating to the cold source assembly of FIGS. 3A and 3B, the base panel may be placed at the bottom of the second cavity of the insulation assembly. Then, a first of the sidewall panels is placed vertically within the second cavity of the insulation assembly and mated with the corresponding tongue and groove features of the base panel. A second of the sidewall panels is then placed vertically within the space of the insulation assembly and mated with the corresponding tongue and groove features of the base panel and the already installed sidewall panel. This step is repeated for each sidewall panel so that an open topped cold source sub-assembly is formed with the hollow center open from above. A container containing biological material may then be placed within the sub-assembly, and the top panel of the cold source assembly may be placed on top of the sub-assembly and mated with the tongue and groove features of each of the sidewall panels. In this configuration, the container is surrounded on all sides by the cold source panels. In embodiments, the cold source assembly may be assembled around the container prior to placing the cold source assembly within the insulation assembly. For example, a cold source assembly comprising two panels, each defining a lateral half of a cylinder, may be placed around one or more containers containing biological material, and the cylindrical assembly of the two cold source panels and the container(s) containing biological material may be placed with the insulation assembly.

The container containing biological material may be sized and shaped substantially the same as the third cavity of the cold source assembly, for example as shown in the cross-section view of FIG. 1C. Further, the cold source assembly may be sized and shaped substantially the same as the second cavity of the insulation assembly. The tight nesting of the insulation assembly, cold source assembly and container provide the advantage of preventing movement of the biological material during transport, and preventing ambient air from occupying voids and increasing the temperatures of the biological material. Additionally, the insulation assembly provides structural support to the cold source assembly by directly contacting the outer surfaces of the panels of the cold source assembly. In embodiments, after a lid panel of a cold source assembly is positioned on a sub-assembly of other cold source panels, a lid panel of the insulation assembly may be sealed with the cylindrical sidewall of the insulation assembly, and the lid of the housing may be sealed with the lower housing portion, in order to fully seal the biological material within the apparatus.

Each of the panels of the cold source assembly may comprise an outer shell defining one or more connected and/or separate internal spaces. For example, a panel defining a sidewall of a cold source assembly may have separate upper and lower internal spaces. The internal space(s) of each panel of a cold source assembly may contain a material capable of absorbing heat such as a phase change material or a cryogenic material. Phase change materials (PCMs) are substances that have a high heat of fusion and which, upon melting at a specific temperature, absorbs a large amount of heat energy during the melting due to the high heat of fusion. Conversely, upon solidifying at a specific temperature, the PCM releases a large amount of heat energy. The particular temperature at which a PCM changes from solid to liquid or changes from liquid to solid is a property of the specific PCM. In embodiments, a PCM is selected so that the target temperature for the transport of the biological material and the specific temperature at which the PCM changes from solid to liquid coincide. For example, if the biological material is to be stored and/or transported at a temperature of about −5° C., then a PCM is selected that melts or solidifies at a temperature of about −5° C. Further for example, if the biological material is to be stored and/or transported at a temperature of about −20° C., then a PCM is selected that melts or solidifies at a temperature of about −20° C. In embodiments, any target temperature is achievable through the selection of a PCM material, or a combination of PCM materials, that results in melting or solidifying at the desired temperature. In addition, the volume/mass of PCM used in the panels of the cold source assembly is based on considerations such as the desired length of time the biological material is to be maintained at the target temperature, the number, mass, or size of the biological material, thermal conductivity properties of the insulation layers, and anticipated operating ambient conditions.

As used herein some PCMs may be categorized as "sub-zero PCMs", which are PCMs with a melting and/or solidifying temperature below, but not including, 0° C. Further, as used herein some PCMs may be categorized as "non-subzero PCMs", which are PCMs with a melting and/or solidifying temperature above and including 0° C., (e.g. water/ice and glycerol). Non-limiting examples of PCMs include paraffin wax, lithium chloride, n-tetradecane, 1-decanol, n-pentadecane, chloroacetic acid-o-cresol eutectic, tetradecylbenzene, sodium chromate decahydrate, n-octanoic acid, chloroacetic acid-phenol eutectic, acetic acid, salt mixture of 37% $NaSO_4$, 17% NaCl and 46% $H_2O$, 1-octadecene, glycerol, n-hexadecane, polyethylene glycol 600, double clathrate of water with tetrahydrofuran and hydrogen sulfide, lithium chloride ethanolate, n-heptadecane, copper nitrate hexahydrate, lactic acid, manganous nitrate hexahydrate, n-octadecane, methyl palmitate, 3-methylpentacosane, orthophosphoric acid hemihydrate, lithium nitrate trihydrate, calcium chloride hexahydrate, gallium, sodium sulfate decahydrate, levulinic acid, and n-eicosane.

In embodiments, prior to use, the PCMs in the cold source panels are charged by cooling the panels to a temperature below the solidification temperature of the selected PCM. Charging is accomplished, for example, by placing the cold source panels containing the PCMs in a refrigeration chamber, for example a freezer. In embodiments, for example as shown in FIGS. 3A and 3B, the base panel and the top panel of a cold source assembly may be flat and space efficient in a freezer space. The sidewall panels may be shaped as radial portions of a hollow tube. This shape has the advantage of being stackable in various configurations in order to occupy less freezer space than a single piece hollow tube. For example, the sidewall panels may be stacked so that the outer curved surface of one sidewall panel faces the inner curved surface of a second sidewall panel. In embodiments, the outer curved surface of one sidewall panel contacts the inner curved surface of a second sidewall panel. Additionally for example, the sidewall panels may be stacked like roof tiles in the freezer space.

In embodiments, the PCMs of the cold source panels may be charged by filling a cooling coil that is disposed within the PCM with a refrigerant (e.g., a cold gas). Further, in embodiments, the PCM may be charged using a cryogenic material. Non-limiting examples of suitable cryogenic materials include solid carbon dioxide, a compressed gas, and liquid nitrogen. When a cryogenic material is used, the cryogenic material can be placed, for example, within one or more cutouts that are placed in the cold source panels containing the PCM for the purpose of receiving the cryogenic material.

In embodiments, the PCM may be activated by mixing two components each stored in a separate compartment within each panel of the cold source assembly, which react with an endothermic reaction.

In embodiments, the PCM is charged while positioned within the apparatus. In embodiments, the PCM is placed into the other components of the apparatus, e.g. the outer housing and insulation assembly, after the PCM has been charged. In embodiments, the PCM is charged within the apparatus using a cryogenic material.

The specific PCM, volume/mass of the PCM and the thermal conductivity properties of the insulation assembly are chosen such that the apparatus maintains the biological material at the target temperature for the desired length of time.

In embodiments, the PCM may be permanently sealed within each panel of the cold source assembly, or the PCM may be reversibly inserted into each panel of the cold source assembly, for example with a valve or a port on an outer surface of the wall of a panel.

Figure 3C:
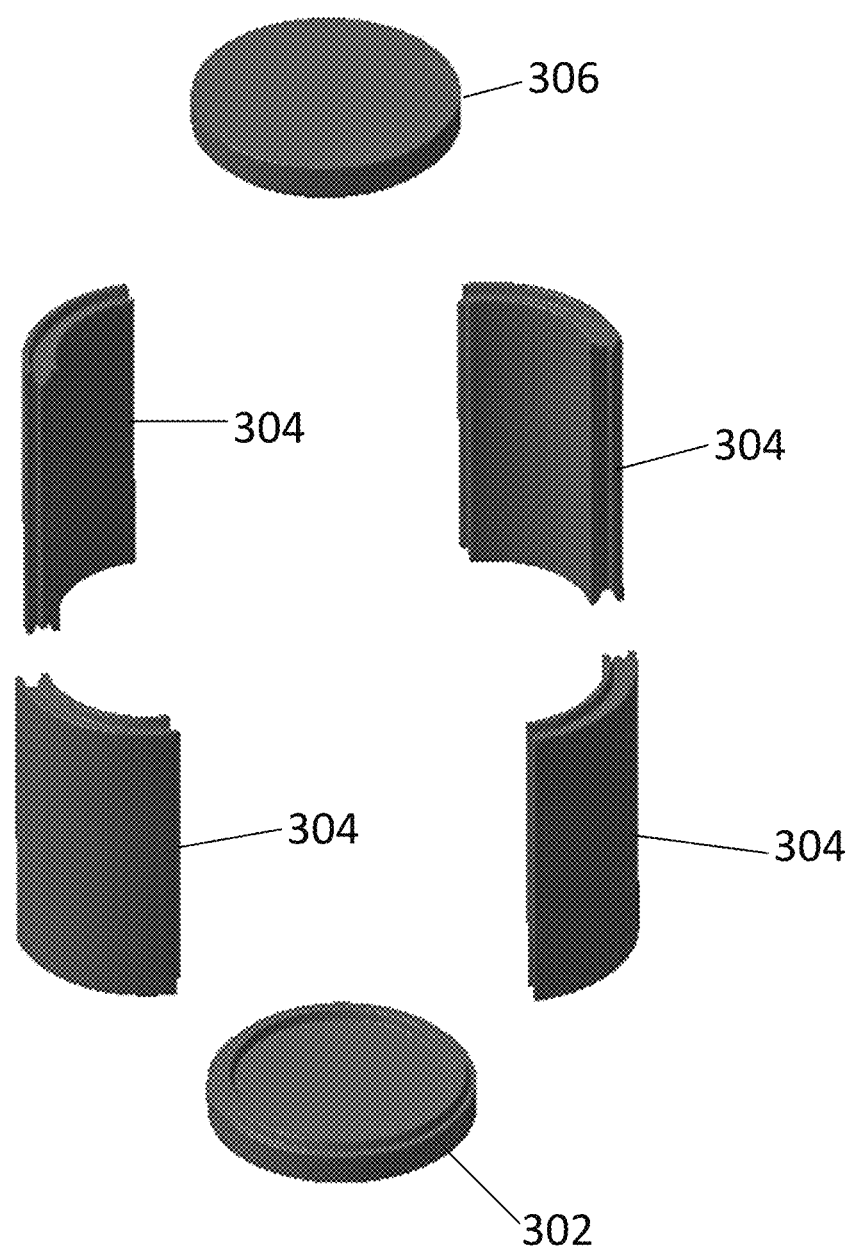

FIG. 3C shows another embodiment of a cold source assembly. As shown, the body panels are thinner than the cold source assembly of FIGS. 3A and 3B. The thickness of the body panels may determine the internal volume, and the thickness may be selected based on the volume of PCM needed to achieve the target temperatures for the target duration.

Figure 3D:
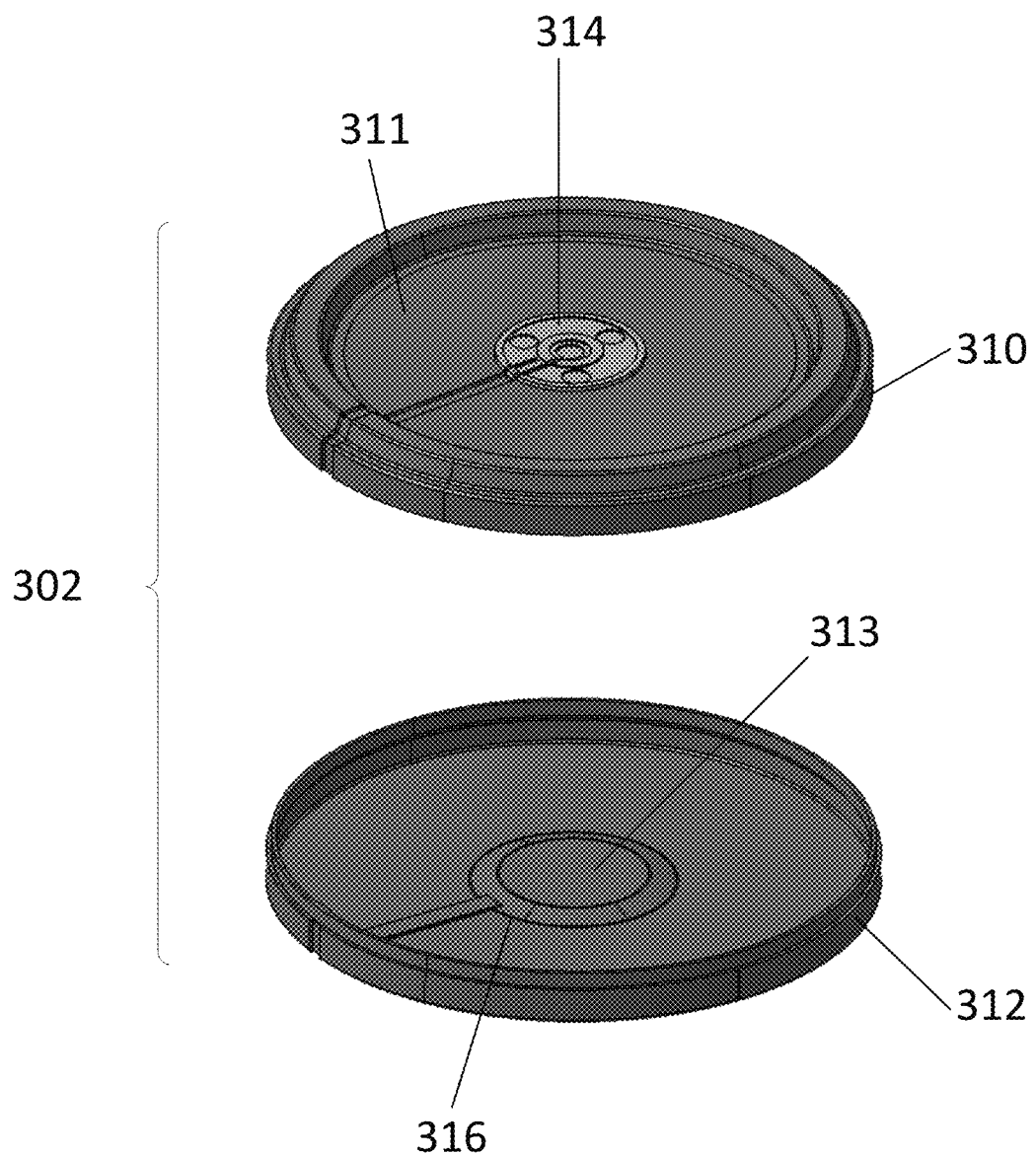

FIG. 3D shows an embodiment of a base panel 302 of a cold source assembly 300. The base panel includes an upper portion 310 with an upper recess 311 receiving a first magnetic wiring coupling 314, and a lower portion 312 with a lower recess 313 receiving a second magnetic wiring coupling 316. The couplings are connected by a wire extending from each coupling to the perimeter of the base panel in order to reduce a thermal bridge between the two couplings. The magnetic coupling on the upper side interfaces with a complementary coupling on a container placed within the cold source assembly, as will be described in greater detail below. The magnetic coupling on the lower side interfaces with a complementary coupling on the insulation assembly.

Containers

Figure 4A:
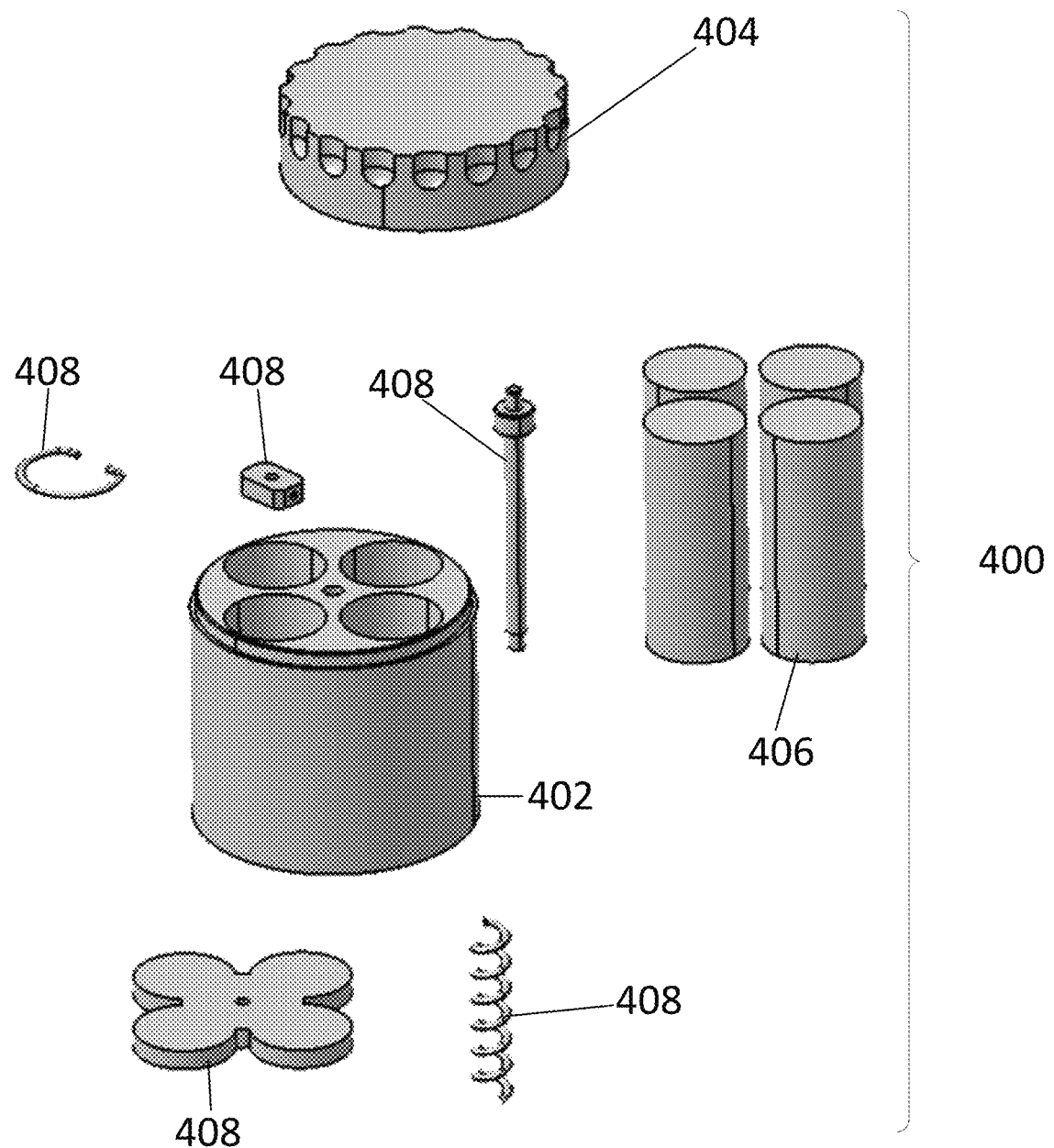
FIGS. 4A-4N show views of biological material containers and portions thereof for cell and tissue samples in accordance with embodiments of the disclosed technology.
Figure 4B:
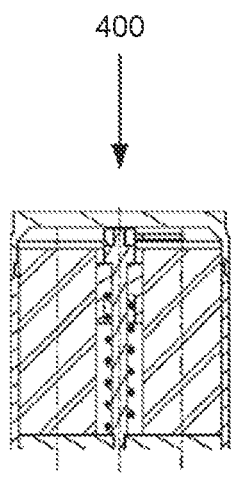
Figure 4C:
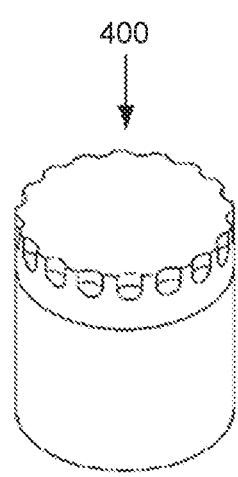
Figure 4E:
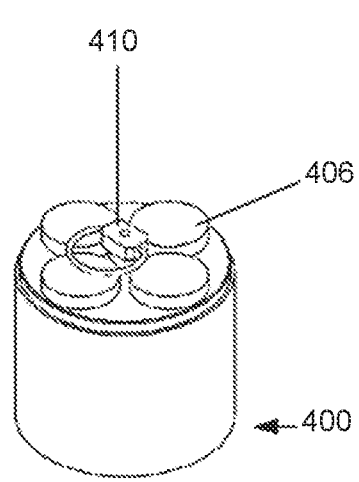
Figure 4D:
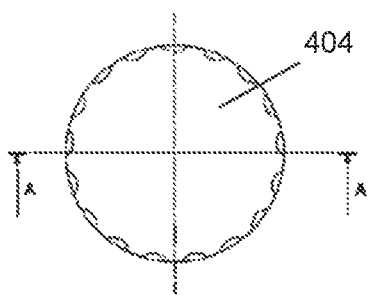
Figure 4F:
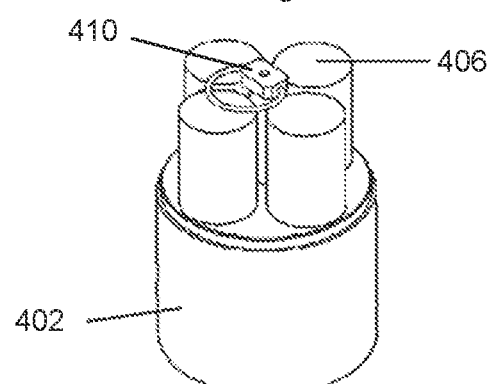
Figure 4G:
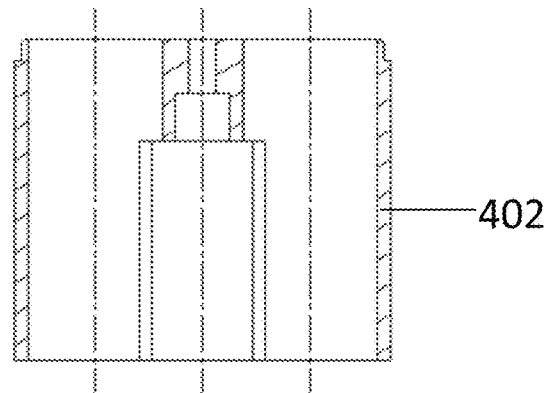
Figure 4J:
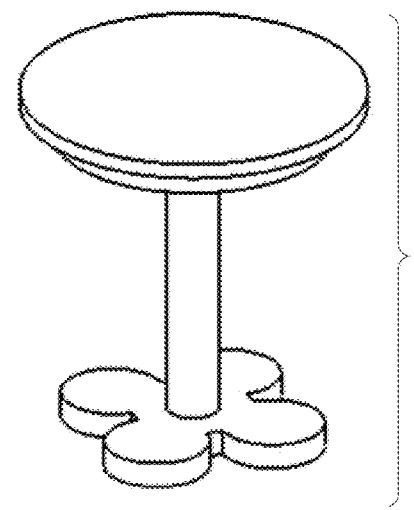
Figure 4H:
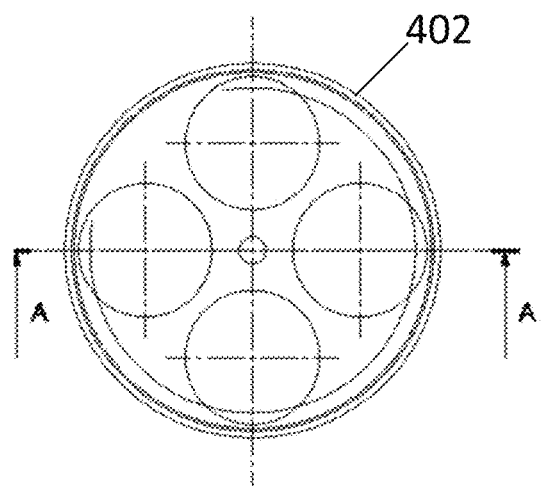
Figure 4I:
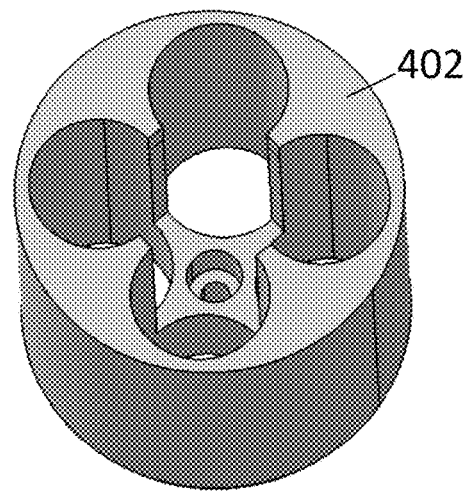
Figure 4K:
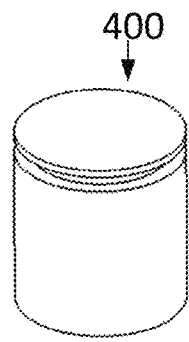
Figure 4L:
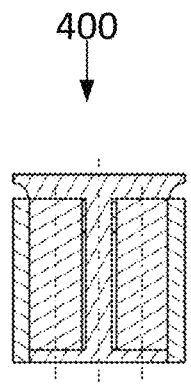
Figure 4M:
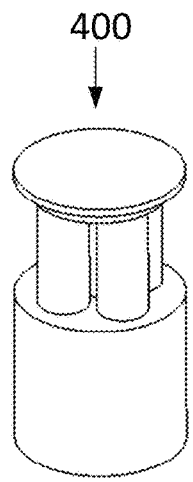
Figure 4N:
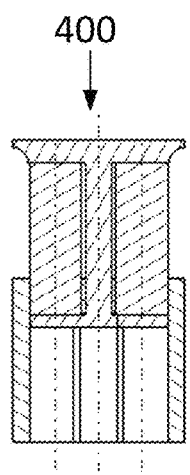

In embodiments, one or more containers holding the biomaterial are placed within the hollow space of the cold source assembly, for example as shown in FIG. 1C. The one or more containers may be specific to the type of biological material being transported. For example, the one or more containers may be specific to transporting cells, tissues, and/or organs. For example, FIGS. 4A-4N show various views of a container for shipping cell and tissue samples. As shown in the exploded view of FIG. 4A a container 400 comprises a body portion 402, a lid 404, vials 406 for a sample of biological material, and components 408 of a vial unloading assembly 410. The body portion 402 defines cylindrical openings to place the vials 406 within the body portion 402, as shown in the cross-section of FIG. 4B. The body portion may be aluminum or another high thermal conductivity material, such as another metal, in order to transfer heat from the biological material to be absorbed by the cold source assembly in order to maintain the target temperature. The lid 404 may be sealed to the body portion 402, as shown in FIGS. 4C and 4D. A vial unloading assembly 410 may be used to pull the vials 406 out of the body portion 402, as shown in FIGS. 4E and 4F. FIGS. 4G-4I show views of the body portion 402. FIG. 4J shows another embodiment of a vial unloading assembly 410, and FIGS. 4K-4N show unloading vials with the unloading assembly of FIG. 4J.

Figure 5A:
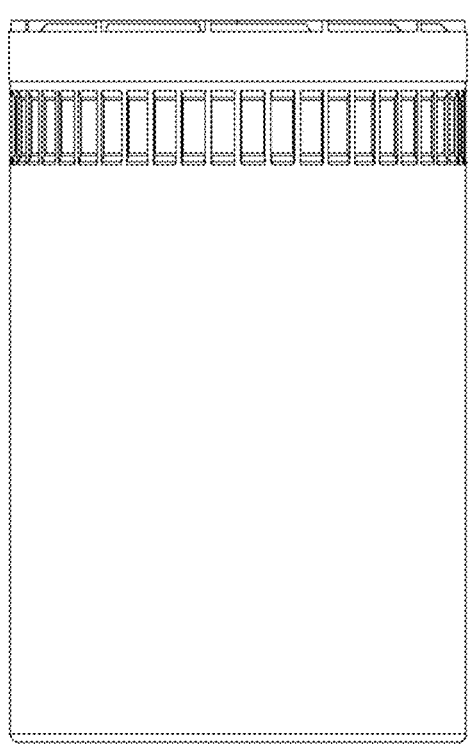
FIGS. 5A-5F show views of biological material containers in accordance with embodiments of the disclosed technology.
Figure 5B:
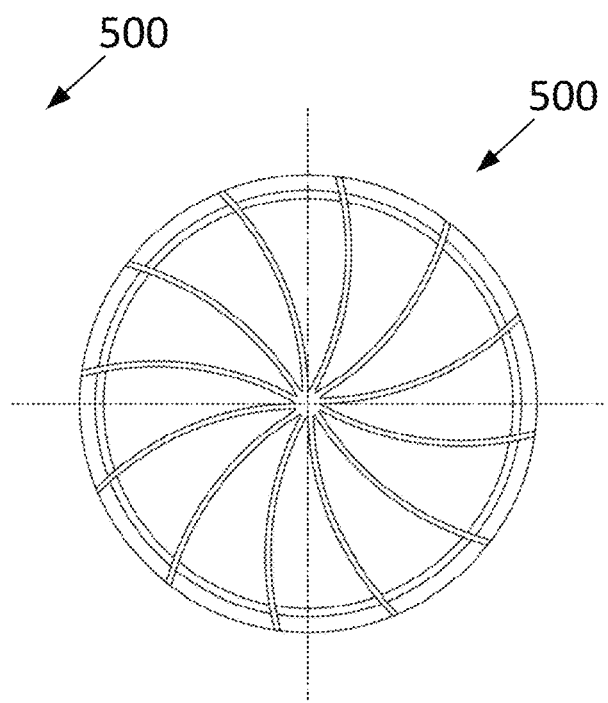
Figure 5C:
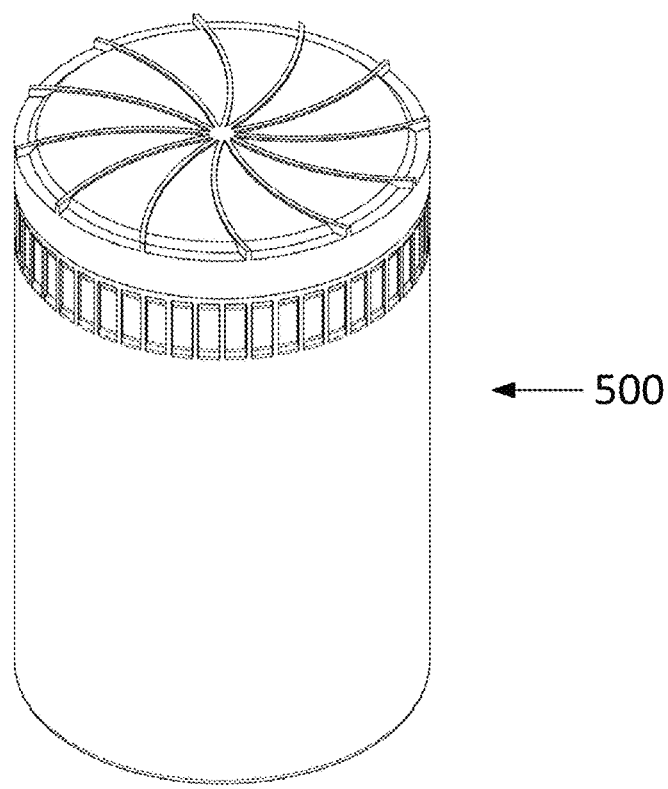

For handling purposes, in embodiments, the container holding the biological material may be an inner container and may be placed within an outer container 500, for example as shown in FIGS. 5A-5C. The outer container may include features allowing a user to easily handle and open the outer container, for example ribs.

Figure 5D:
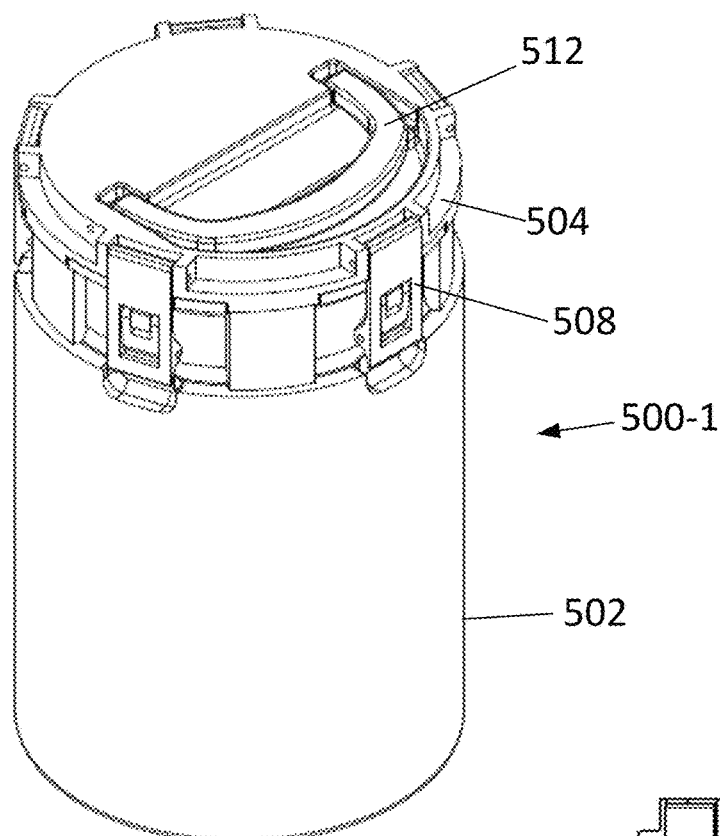
Figure 5F:
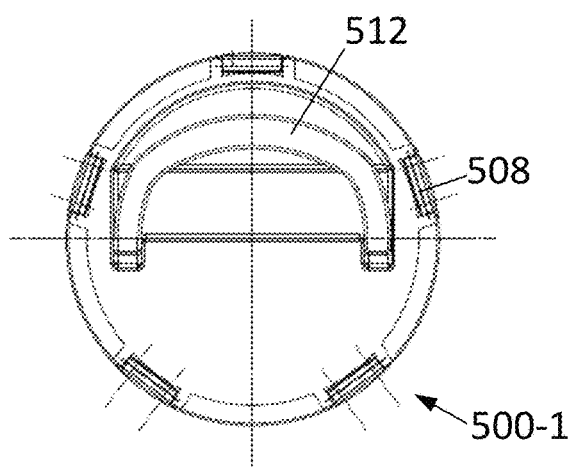
Figure 5E:
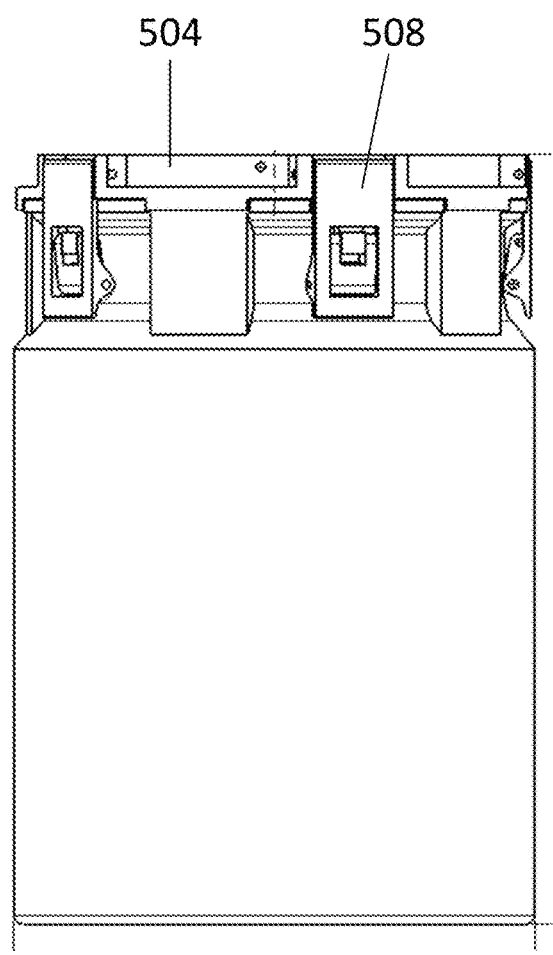

FIGS. 5D-5F show an embodiment of an embodiment of an outer container 500-1 similar to the outer container 500 shown in FIGS. 5A-5C. The outer container 500-1 comprises a body portion 502, a lid 504, and compression clips 508 for sealing the lid. The outer container 500-1 includes a foldable handle 512 rotatably coupled to the lid 504 for manipulating the outer container 500-1. In embodiments, outer containers, for example 500 and 500-1 include recesses to receive alignment magnets for interfacing with the cold source assembly.

Figure 6D:
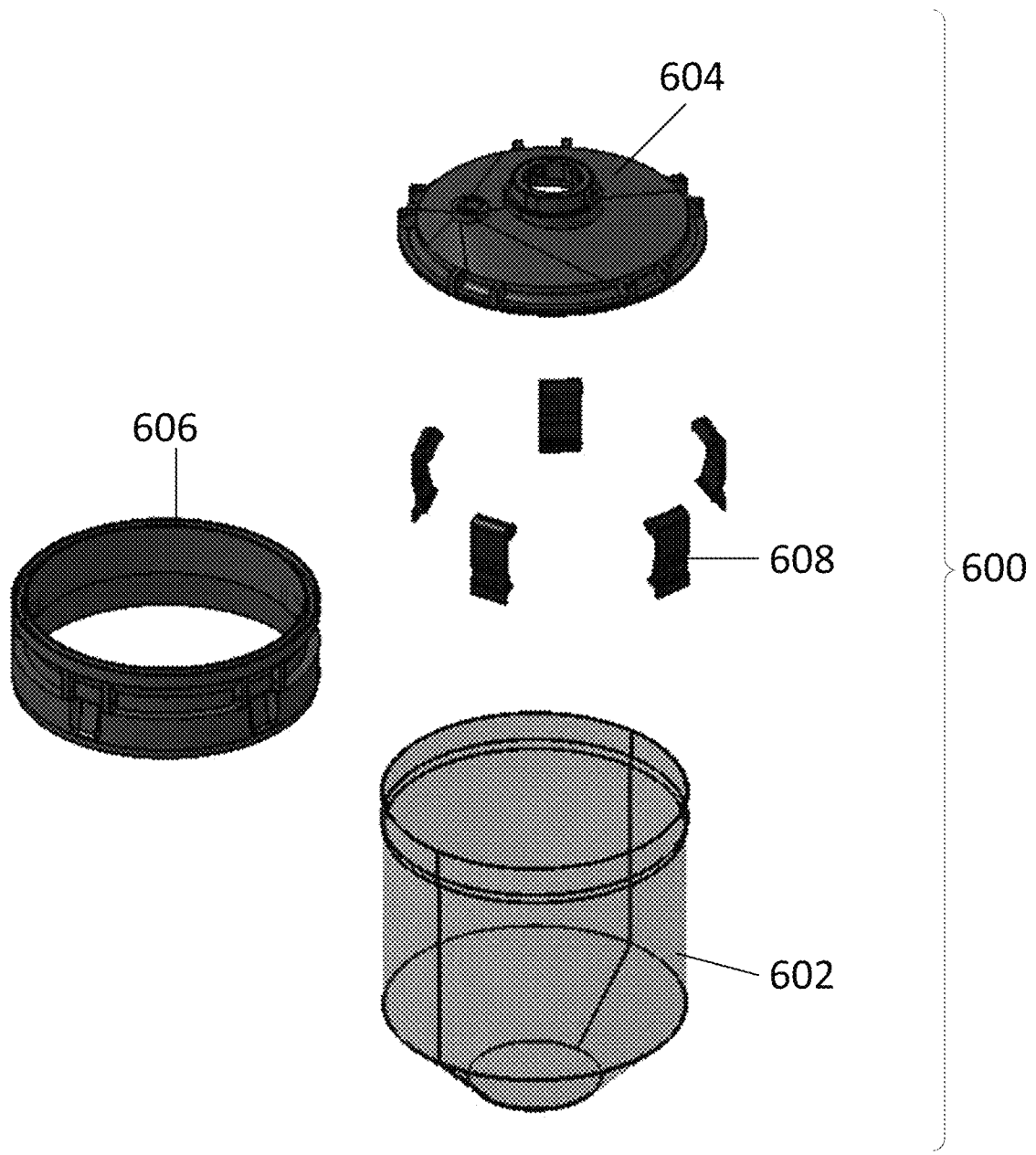

In embodiments, for example as shown in FIGS. 6A-6D, a container for shipping organs may be placed within one or more outer containers placed within a cold source assembly. Examples of organs to be transported include, but are not limited to, hearts, a kidneys, pancreases, livers, intestines, and lungs. As shown in the exploded view of FIG. 6D a container 600 comprises a body portion 602, a lid 604, a sealing ring 606, and compression clips 608 for sealing the lid. The volume of the container may be between about 200 mL to about 2,000 mL. Different sized body portions 602 can be coupled to a sealing ring 606 to achieve different volumes of containers with the same closure mechanism. In embodiments, the sealing ring 606 may be coupled to the body portion 602 with adhesives, threading, a press fit, or clips. As shown in FIGS. 6A-6C, the lid 604 includes a first cap 610 and a second cap 612, the caps may be used for filling the container with a fluid, for example a cryoprotectant, and for expelling bubbles, respectively.

Figure 6E:
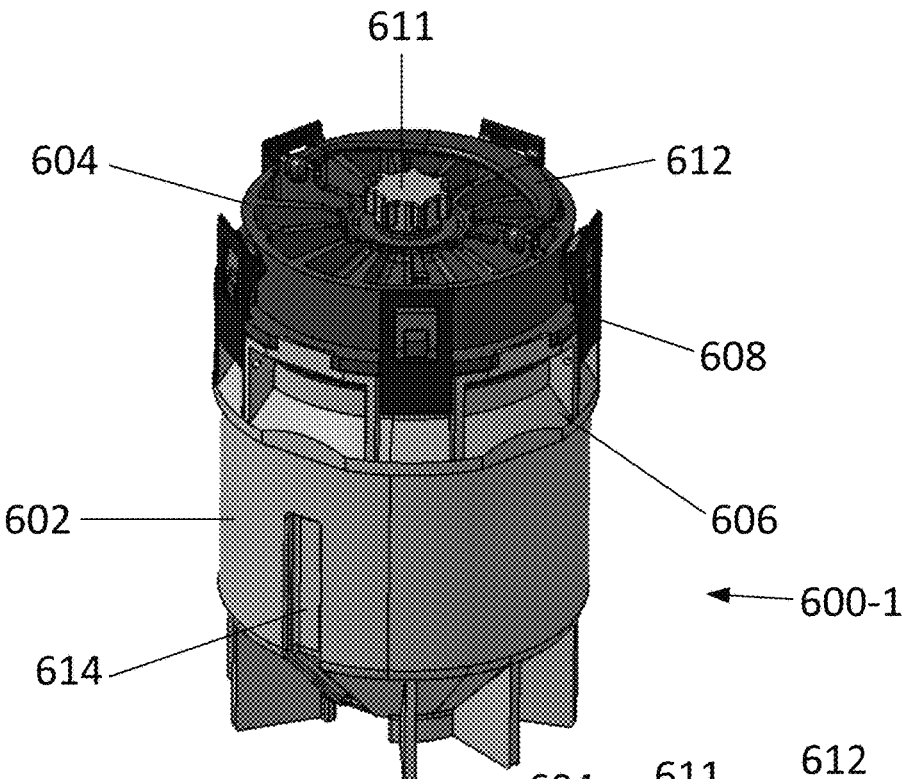
Figure 6G:
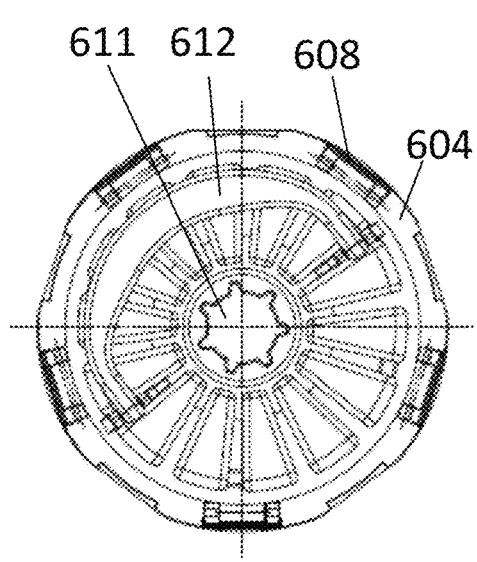
Figure 6F:
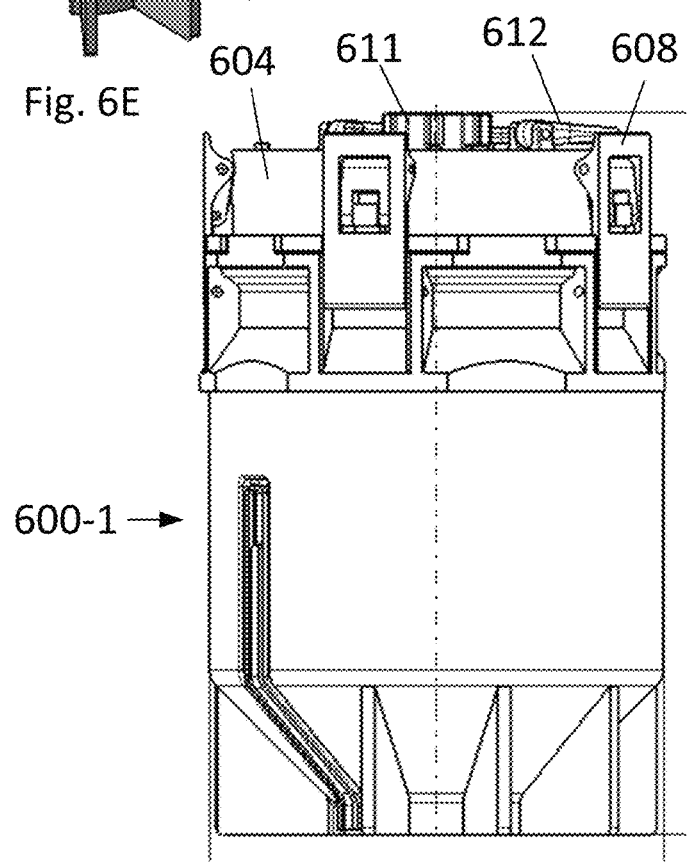

FIGS. 6E and 6F show an embodiment of a container 600-1 for shipping organs similar to the container 600 shown in FIGS. 6A-6D. The container 600-1 also comprises a body portion 602, a lid 604, a sealing ring 606, and compression clips 608 for sealing the lid. The lid of container 600-1 includes a single cap 611 for filling the container with a fluid, for example a cryoprotectant, and for expelling bubbles. The container 600-1 further includes a foldable handle 612 rotatably coupled to the lid 604 for manipulating the container 600-1. The body portion 602 of container 600-1 defines a groove 614 sized to accommodate wiring for sensors, for example a thermocouple coupled to the exterior of the body portion used to determine the internal temperature of the container.

The volumes of the containers holding the biological material when sealed are watertight. During use, the volumes of the containers holding the biological material may contain a cryoprotectant composition, for example, but not limited to, a cryoprotectant composition as disclosed in U.S. Pat. No. 9,986,733, assigned to X-Therma, Inc., the contents of which are incorporated by reference for all purposes. Cryoprotectant compositions may be used to reduce or prevent freezing damage caused by ice crystal formation. In embodiments, the cryoprotectant compositions preserve a biological material for an amount of time longer than if the biological material were not exposed to reduced temperatures. In embodiments, using cryoprotectant compositions, for example as disclosed in U.S. Pat. No. 9,986,733, it is advantageous to store biological samples at ranges between 0° C. and −15° C. in order to avoid ice formation and therefore ice phase transitions. Further, in embodiments, it is advantageous to store biological samples, particularly partially frozen biological samples, at ranges including even lower temperatures, for example at ranges between 0° C. and −40° C., in order to provide further metabolic protection due to the lower temperature.

Organ Tray

In embodiments an organ tray for supporting and limiting movement of an organ within a containers for shipping organs may be used. Organ trays may include one or more panels coupled together, for example, with hinges, clasps, and/or integrally form clips, in order to define an internal cavity in which the organ is positioned. One or more of the panels of the organ tray may include apertures for allowing cryoprotectant to flow around an organ positioned within the organ tray. The organ tray may further include a handle extending from one or more of the panels for allowing insertion and removal of the organ tray from a container. FIGS. 7A-7C show an embodiment of an organ tray 700. Organ tray 700 may be positioned within containers 600. As shown, the organ tray 700 comprises a base 702 and two side portions 704. The side portions 704 are pivotably coupled to the base 702 with hinges so that the organ tray may transfer between an open configuration as shown in FIG. 7A to a closed configuration in FIG. 7B. The organ may be placed into the organ tray in the open configuration, transported in the closed configuration, and removed from the organ tray in the open configuration. The base 702 and side portions 704 may each define a plurality of slots 706 which allow cryoprotectant to flow around an organ positioned within the organ tray. The organ tray 700 further comprises handles 708 coupled to each side portion 704. The handles may be used to place/remove the organ tray into/out of the container 600.

Additional Features

In embodiments, the apparatus includes computer hardware and software, including a processor, storage, memory, user input devices, and sensors, configured to sense, detect, record, transmit (e.g., to a remote server (for example, but not limited to, cloud servers), a mobile device, a desktop computer, or a combination thereof), and/or report the value(s) of parameter(s) such as temperature, humidity, location, motion, time, opening of the lid. In embodiments, the apparatus comprises one or more of: a temperature sensor, an exterior temperature sensor, a humidity sensor, a motion sensor, a global positioning system (GPS) antenna, a cellular network and/or Wi-Fi antenna, a lid opening sensor, a digital display, a keypad, an audible alarm apparatus, a memory storage unit, and a power supply (e.g., a battery and/or a receptacle that can be connected to an external power source). Any of the components of the system may be connected with wires or wirelessly, e.g. RFID UFID, Bluetooth, or a combination of the two.

In embodiments, the apparatus comprises a digital display. The digital displaying may include, but is not limited to, a light-emitting diode (LED) or a liquid crystal display (LCD). In embodiments, the digital display reports one or more parameters selected from the group consisting of container temperature, exterior temperature, humidity inside the container, time elapsed since the biological material was placed inside the container, a visual temperature and/or humidity alarm, the amount of motion detected inside the container, the number of lid opening events since the biological material was initially placed and/or sealed inside the container, the time and/or location of a lid-opening event, the elapsed time of a lid-opening event, and power supply (e.g., battery) level. In addition, one or more of these parameters may be transmitted from the apparatus (e.g., via a cellular or Wi-Fi antenna) to a remote server, a mobile device, and/or a desktop computer, e.g., so that real-time information about the status of the apparatus and/or biological material, for example the temperature of the inner chamber or biological material, can be made available to a user. In embodiments, an event log is stored in the apparatus (e.g., in a memory storage unit) and/or on a remote server and subsequently made available to the user (e.g., the information is reported by the digital display on the apparatus and/or a mobile device or desktop computer). The event log may report, as non-limiting examples, the location (e.g., GPS coordinates) of the apparatus, the time (e.g., local time) the location was recorded, the elapsed time since the biological material was placed or sealed inside the apparatus, the location and/or time that the apparatus lid was opened, the time (e.g., local time) that the apparatus lid was opened, the elapsed time of a lid-opening event, and the amount of motion detected in the container (e.g., amount of motion experienced by the biological material).

Figure 8:
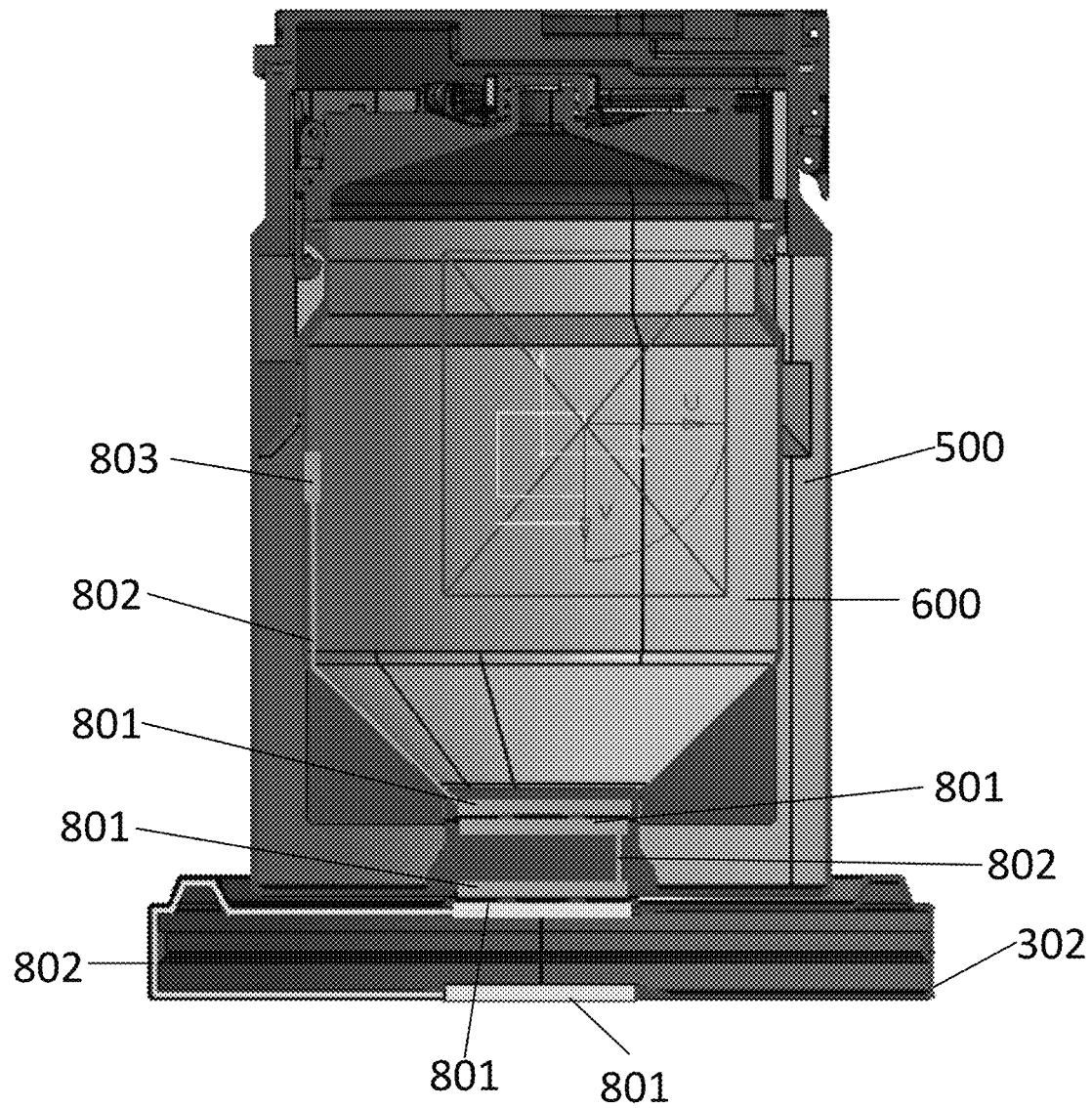
FIG. 8 shows a cross-section of an assembly including magnetic coupling in accordance with embodiments of the disclosed technology.

FIG. 8 shows a portion of an assembly showing the series of magnetic couplings 801 between a cold source base plate 302, outer container 500, and container 600. The magnets of each coupling 801 hold electrical contacts of the wiring 802 together in order to electrically connect a sensor 803, for example a thermocouple, to a processor. As shown, the sensor is positioned at an intermediate height on the container 600 in order to be close to the organ within the container. The magnetic coupling is advantageous because a user of the assembly does not have to directly interface with the wiring in order to connect a temperature sensor, and instead the assembly of nesting the components will automatically connect the sensor to the electronics.

Data

Figure 9A:
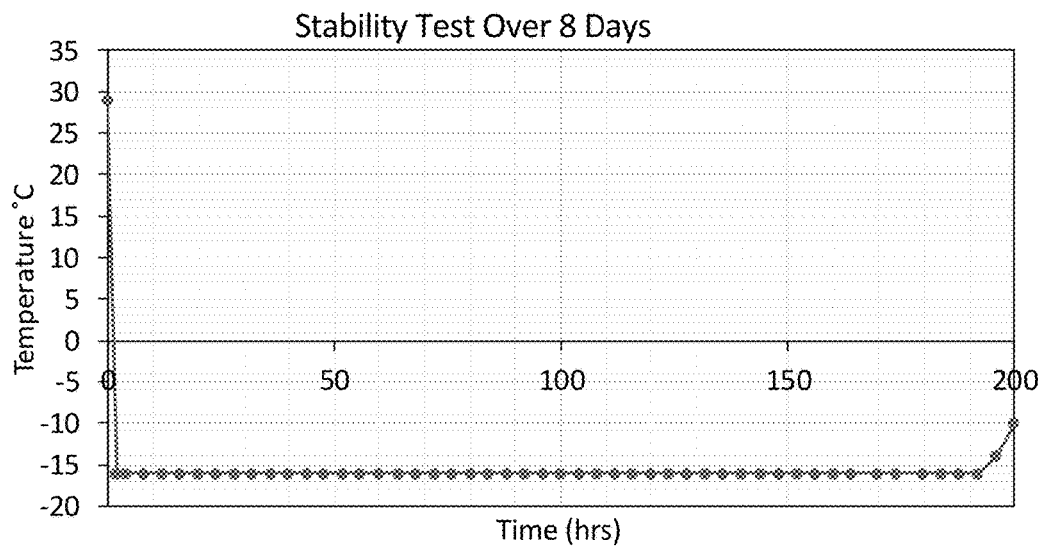
FIGS. 9A-9C show data related to storage of biological material in accordance with embodiments of the disclosed technology.
Figure 9B:
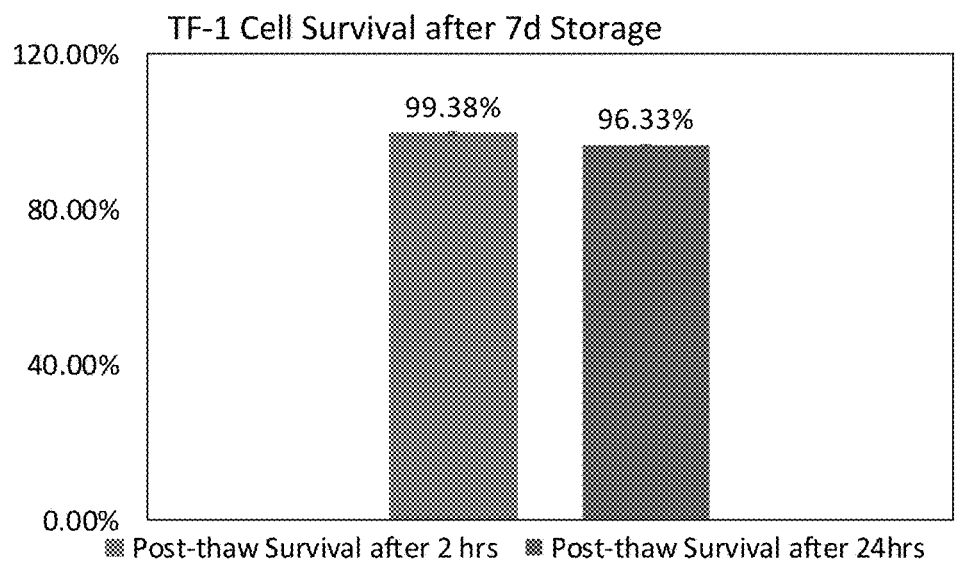
Figure 9C:
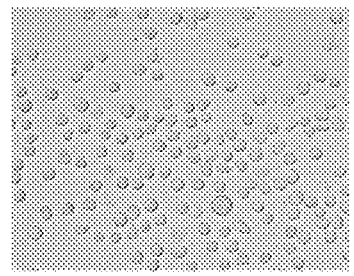

FIGS. 9A-9C show data corresponding to using the components of the biological transport apparatus 100 discussed above. As background, organs are currently transported in plastic bags in a cooler filled with ice, i.e. frozen water. The organ through the plastic bags may essentially directly contact the ice causing freezing and then ice damage, which is detrimental.

A first example result relates to successful murine heart preservation using the components of the biological transport apparatus 100 discussed above at −5° C. Heterotopic heart transplantation was performed in a syngeneic donor/recipient combination using male C57BL/6 mice. Three groups were studied: Group 1 (baseline control group); no ischemia as a baseline control; Group 2 (experimental group); hearts stored 24 h at −5° C. using cryoprotectants (e.g. as described in U.S. Pat. No. 9,986,773) with a biological transport apparatus as discussed above, and Group 3 (control group); hearts stored 24 h in HTK solution at 4° C. Static storage was performed without machine perfusion or oxygenation. Post-transplant functional graft assessment was assessed by daily palpation. Graft viability and tissue integrity were assessed by histology, immunohistochemistry, and gene expression at postoperative date 3 and postoperative day 30. The results showed that all experimental group heart grafts regained a regular heartbeat and sinus rhythm with survival through the study endpoint at postoperative day 30. The control group grafts did not regain any heartbeat. Therefore the components of the biological transport apparatus 100 discussed above including the use of cryoprotectants were shown to prevent ice damage at high sub-zero temperatures, maintained a stable environment for the biological material and enabled successful preservation and transplantation of murine heart grafts well beyond the critical ischemia time for conventional static cold storage.

FIG. 9A shows the internal temperature of a biological transport apparatus 100 as discussed above over the course of 8 days. As shown in FIG. 9A, TF-1 cells were stored at a consistent −16° C. over the extended period of 7 days. TF-1 is a cell line originated from human erythroleukemia cells, which is GM-CSF and interleukin-3 IL-3 dependent. As shown in FIG. 9B, post-thaw survival was evaluated using an alamarBlue assay on Day 0 (2 hours post thaw) and Day 1 (24 hours post thaw). The cell survival rates, defined as total post-thaw live cell count/total cells count prior to freeze, after the 2 hour thawing and 24 hour thawing were over 95%, and the cells exhibited regular morphology, as shown in FIG. 9C, comparable to fresh TF-1 cells.

The biological transport apparatus and methods of use as described above, may be used for a variety of purposes. Non-limiting examples of biological samples that are suitable for preservation, storage, and shipping with the present technology include nucleic acids (e.g. DNA, RNA), amino acids, proteins, stem cell growth factors, peptides, antibodies, lipids, and composite structures (e.g. liposomes), cells, cell components (e.g. exosomes), cell clusters, tissues, tissue grafts, partial or whole organs from any biological kingdom. (e.g., animalia (including but not limited to humans and livestock animals), Plantae, Fungi (including but not limited to mushrooms), Protista, archaea/archaea-bacteria, and bacteria/eubacteria). In embodiments, the present technology can further be used with organoid, iPSCs, MSCs, HSCs, whole bone marrow, and platelets. Further, in embodiments, the present technology can apply to food products. In embodiments a frozen food product is selected from a group comprising ice cream, yogurt, seafood, freshwater produce, fruit, and meat product.

The various aspects, embodiments, implementations or features of the described embodiments can be used separately or in any combination. In particular, it should be appreciated that the various elements of concepts from FIGS. 1A-9C may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An apparatus comprising:
   an outer housing comprising a lid and a lower housing portion, the lower housing defining a first cavity and the lid movable with respect to the lower housing portion between an open configuration and a closed configuration;
   an insulation assembly positioned within the first cavity, wherein the insulation assembly comprises a base insulation panel, a cylindrical insulation sidewall panel, and an insulation lid defining a second cavity;
   a cold source assembly positioned within the second cavity, wherein the cold source assembly comprises a plurality of panels, wherein the plurality of panels comprise a plurality of curved sidewall panels interconnectable to form a closed boundary, wherein the closed boundary of the cold source assembly defines a third cavity, wherein the plurality of curved sidewall panels define radial sides of a hollow cylinder of the third cavity, and wherein each of the plurality of panels comprise a phase change material having a property to maintain an object at a target temperature between 0° C. to −40° C. for a target duration of at least 4 hours; and
   a container positioned within the third cavity, wherein the container is removable when the lid is moved to the open configuration;
   wherein the container is configured to contain biological material that should be maintained at a temperature between 0° C. to −40° C. for a target duration of at least 4 hours.

2. The apparatus of claim 1, wherein the biological material is maintained at a temperature between 0° C. to −15° C. for at least 4 hours.

3. The apparatus of claim 1, wherein the container contains a cryoprotectant composition configured to prevent freezing damage to the biological material at the target temperature for the target duration.

4. The apparatus of claim 1, wherein the insulation assembly comprises a plurality of vacuum insulation panels, and wherein the plurality of vacuum insulation panels comprise a cylindrical vacuum insulation panel.

5. The apparatus of claim 1, wherein the plurality of curved sidewall panels consist of four identical curved sidewall panels each defining one fourth of a circumference of the hollow cylinder.

6. The apparatus of claim 5, wherein the four identical curved sidewall panels are configured to be stacked so that an outer curved surface of one sidewall panel contacts an inner curved surface of a second sidewall in order for the stacked sidewalls panels to be placed within a freezer to charge the phase change material in the stacked sidewall panels.

7. The apparatus of claim 5, wherein the cold source assembly comprises a circular base panel and a circular lid panel, and wherein the four identical curved sidewall panels each engage the circular base panel, the circular lid, and two adjacent curved sidewall panels with tongue and groove joints.

8. The apparatus of claim 1, wherein the insulation assembly comprises a plurality of vacuum insulation panels, wherein the plurality of vacuum insulation panels comprise a cylindrical vacuum insulation panel, wherein the plurality of curved sidewall panels consist of four identical curved sidewall panels each defining one fourth of a circumference of the hollow cylinder, and wherein each of the curved sidewall panels contacts an internal surface of the cylindrical vacuum insulation panel.

9. The apparatus of claim 1, wherein the biological material is a cell sample, wherein the cell sample is contained in a vial containing a cryoprotectant composition configured to prevent freezing damage to the cell sample at the target temperature for the target duration, and wherein the container defines a cavity to hold the vial.

10. The apparatus of claim 1, wherein the biological material is an organ, wherein the organ is contained within the container with a cryoprotectant composition configured to prevent freezing damage to the organ at the target temperature for the target duration.

11. The apparatus of claim 1, wherein the biological material is a tissue, transplantable tissue, or an engineered tissue, wherein the biological material is contained within the container with a cryoprotectant composition configured to prevent freezing damage to the biological material at the target temperature for the target duration.

* * * * *